(12) United States Patent
Garcia-Martinez

(10) Patent No.: US 7,807,132 B2
(45) Date of Patent: Oct. 5, 2010

(54) METHODS FOR MAKING MESOSTRUCTURED ZEOLITIC MATERIALS

(75) Inventor: Javier Garcia-Martinez, Alicante (ES)

(73) Assignee: Rive Technology, Inc., Cambridge, MA (US)

(*) Notice: Subject to any disclaimer, the term of this patent is extended or adjusted under 35 U.S.C. 154(b) by 605 days.

(21) Appl. No.: 11/717,286

(22) Filed: Mar. 13, 2007

(65) Prior Publication Data
US 2008/0138274 A1 Jun. 12, 2008

(30) Foreign Application Priority Data
Dec. 7, 2006 (ES) .................. 200603127

(51) Int. Cl.
B01J 29/06 (2006.01)
C01B 33/36 (2006.01)

(52) U.S. Cl. .................. 423/716; 423/700; 423/712; 423/717; 502/70; 502/77; 502/78; 502/79

(58) Field of Classification Search .................. 502/70, 502/77, 78, 79; 423/700, 716, 712, 717
See application file for complete search history.

(56) References Cited

U.S. PATENT DOCUMENTS

| | | |
|---|---|---|
| 3,709,853 A | 1/1973 | Karapinka |
| 3,864,280 A | 2/1975 | Schneider |
| 4,016,218 A | 4/1977 | Haag et al. |
| 4,088,671 A | 5/1978 | Kobylinski |
| 4,564,207 A | 1/1986 | Russ et al. |
| 4,637,623 A | 1/1987 | Bubik |
| 4,836,737 A | 6/1989 | Holmes et al. |
| 4,891,458 A | 1/1990 | Innes et al. |
| 4,968,405 A | 11/1990 | Wachter |
| 5,013,699 A | 5/1991 | Vassilakis et al. |
| 5,051,385 A | 9/1991 | Wachter |
| 5,061,147 A | 10/1991 | Nespor |
| 5,095,169 A | 3/1992 | Skeels et al. |
| 5,116,794 A | 5/1992 | Skeels et al. |
| 5,134,242 A | 7/1992 | Le et al. |
| 5,134,243 A | 7/1992 | Bhore et al. |
| 5,160,033 A | 11/1992 | Vassilakis et al. |
| 5,200,058 A | 4/1993 | Beck et al. |
| 5,207,892 A | 5/1993 | Vassilakis et al. |
| 5,208,197 A | 5/1993 | Vassilakis et al. |
| 5,221,648 A | 6/1993 | Wachter |
| 5,232,580 A | 8/1993 | Le et al. |
| 5,256,277 A | 10/1993 | Del Rossi et al. |
| 5,258,570 A | 11/1993 | Skeels et al. |
| 5,260,501 A | 11/1993 | Bhore et al. |
| 5,288,393 A | 2/1994 | Jessup et al. |
| 5,308,475 A | 5/1994 | Degnan et al. |
| 5,344,553 A | 9/1994 | Shih |
| 5,347,060 A | 9/1994 | Hellring et al. |
| 5,393,718 A | 2/1995 | Skeels et al. |
| 5,458,929 A | 10/1995 | Earls et al. |
| 5,510,431 A | 4/1996 | Earls et al. |
| 5,538,710 A | 7/1996 | Guo et al. |
| 5,601,798 A | 2/1997 | Cooper et al. |
| 5,614,453 A | 3/1997 | Occelli |
| 5,659,099 A | 8/1997 | Skeels et al. |
| 5,672,556 A | 9/1997 | Pinnavaia et al. |
| 5,712,402 A | 1/1998 | Pinnavaia et al. |
| 5,744,673 A | 4/1998 | Skeels et al. |
| 5,785,946 A | 7/1998 | Pinnavaia et al. |
| 5,786,294 A | 7/1998 | Sachtler et al. |
| 5,795,559 A | 8/1998 | Pinnavaia et al. |
| 5,800,800 A | 9/1998 | Pinnavaia et al. |
| 5,840,264 A | 11/1998 | Pinnavaia et al. |
| 5,855,864 A | 1/1999 | Pinnavaia et al. |
| 5,858,457 A | 1/1999 | Brinker et al. |
| 5,892,080 A | 4/1999 | Alberti et al. |
| 5,958,367 A | 9/1999 | Ying et al. |
| 5,958,624 A | 9/1999 | Frech et al. |
| 5,961,817 A | 10/1999 | Wachter et al. |
| 5,985,356 A | 11/1999 | Schultz et al. |
| 5,993,768 A | 11/1999 | Zappelli et al. |
| 6,004,617 A | 12/1999 | Schultz et al. |
| 6,015,485 A | 1/2000 | Shukis et al. |

(Continued)

FOREIGN PATENT DOCUMENTS

WO 2006/031259 3/2006

(Continued)

OTHER PUBLICATIONS

Al-Khattaf, S. et al., "The Role of Diffusion in Alkyl-Benzenes Catalytic Cracking," *Appl. Catal. A: Gen.*, 226:139-153 (2002).

(Continued)

*Primary Examiner*—Elizabeth D Wood
(74) *Attorney, Agent, or Firm*—Hovey Williams LLP

(57) ABSTRACT

A quantity of solution sufficient to dissolve a pH controlling substance and/or substantially dissolve a surfactant without substantial excess solution is controlled under a set of time and temperature conditions to transform an inorganic material having long-range crystallinity to a mesostructure having long-range crystallinity. The method employs concentrated conditions that have a consistency similar to a thick slurry. The economic viability of scaling up such thick slurry methods is improved relative to prior more dilute methods of transforming an inorganic material to a mesostructure.

21 Claims, 16 Drawing Sheets

U.S. PATENT DOCUMENTS

| | | | |
|---|---|---|---|
| 6,022,471 | A | 2/2000 | Wachter et al. |
| 6,027,706 | A | 2/2000 | Pinnavaia et al. |
| 6,096,828 | A | 8/2000 | DePorter et al. |
| 6,106,802 | A | 8/2000 | Lujano et al. |
| 6,162,414 | A | 12/2000 | Pinnavaia et al. |
| 6,193,943 | B1 | 2/2001 | Pinnavaia et al. |
| 6,204,424 | B1 | 3/2001 | Yadav et al. |
| 6,319,872 | B1 | 11/2001 | Manzer et al. |
| 6,334,988 | B1 | 1/2002 | Gallis et al. |
| 6,391,278 | B1 | 5/2002 | Pinnavaia et al. |
| 6,410,473 | B1 | 6/2002 | Pinnavaia et al. |
| 6,413,489 | B1 | 7/2002 | Ying et al. |
| 6,413,902 | B1 | 7/2002 | Pinnavaia et al. |
| 6,419,820 | B1 | 7/2002 | Bogdan et al. |
| 6,476,085 | B2 | 11/2002 | Manzer et al. |
| 6,476,275 | B2 | 11/2002 | Schmidt et al. |
| 6,489,168 | B1 | 12/2002 | Wang et al. |
| 6,495,487 | B1 | 12/2002 | Bogdan |
| 6,524,470 | B1 | 2/2003 | Kasztelan et al. |
| 6,538,169 | B1 | 3/2003 | Pittman et al. |
| 6,544,923 | B1 | 4/2003 | Ying et al. |
| 6,548,440 | B1 | 4/2003 | Pham et al. |
| 6,558,647 | B2 | 5/2003 | Lacombe et al. |
| 6,580,003 | B2 | 6/2003 | Deng et al. |
| 6,583,186 | B2 | 6/2003 | Moore, Jr. |
| 6,585,952 | B1 | 7/2003 | Pinnavaia et al. |
| 6,592,764 | B1 | 7/2003 | Stucky et al. |
| 6,623,967 | B1 | 9/2003 | Willson, III |
| 6,649,413 | B1 | 11/2003 | Schultz et al. |
| 6,669,924 | B1 | 12/2003 | Kaliaguine et al. |
| 6,702,993 | B2 | 3/2004 | Pinnavaia et al. |
| 6,706,169 | B2 | 3/2004 | Pinnavaia et al. |
| 6,706,659 | B2 | 3/2004 | Gillespie et al. |
| 6,710,003 | B2 | 3/2004 | Jan et al. |
| 6,746,659 | B2 | 6/2004 | Pinnavaia et al. |
| 6,756,515 | B2 | 6/2004 | Rende et al. |
| 6,762,143 | B2 | 7/2004 | Shan et al. |
| 6,770,258 | B2 | 8/2004 | Pinnavaia et al. |
| 6,797,153 | B1 | 9/2004 | Fukuyama et al. |
| 6,797,155 | B1 | 9/2004 | Chester et al. |
| 6,800,266 | B2 | 10/2004 | Pinnavaia et al. |
| 6,809,061 | B2 | 10/2004 | Bogdan et al. |
| 6,811,684 | B2 | 11/2004 | Mohr et al. |
| 6,814,943 | B2 | 11/2004 | Radcliffe et al. |
| 6,818,589 | B1 | 11/2004 | Gillespie |
| 6,841,143 | B2 | 1/2005 | Inagaki et al. |
| 6,843,906 | B1 | 1/2005 | Eng |
| 6,843,977 | B2 | 1/2005 | Pinnavaia et al. |
| 6,846,546 | B2 | 1/2005 | Kuroda et al. |
| 6,866,925 | B1 | 3/2005 | Chane-Ching |
| 6,869,906 | B2 | 3/2005 | Pinnavaia et al. |
| 7,589,041 | B2 * | 9/2009 | Ying et al. .................. 502/64 |
| 2003/0054954 | A1 | 3/2003 | Chane-Ching et al. |
| 2004/0067842 | A1 | 4/2004 | Pinnavaia et al. |
| 2004/0138051 | A1 | 7/2004 | Shan et al. |
| 2004/0179996 | A1 | 9/2004 | Shan et al. |

FOREIGN PATENT DOCUMENTS

| | | |
|---|---|---|
| WO | 2006/038912 | 4/2006 |

OTHER PUBLICATIONS

Bagri, R. et al., "Catalytic Pyrolysis of Polyethylene," *Anal. Pyrolysis*, 63:29-41 (2002).

Corma, A., "From Microporous to Mesoporous Molecular Sieve Materials and Their Use in Catalysis," *Chem. Rev.*, 97:2373-2419 (1997).

"CSIC NM014-Method of Preparation of Mesoporous Alumina with High Thermal Stability," http://www.serina.es/escaparate/verproducto.cgi?idproducto=4980&refcompra=NULO, downloaded May 9, 2007, 2 pgs.

Davis, M.E., "Ordered Porous Materials for Emerging Applications," *Nature*, 417:813-821 (2002).

Davis, M.E., "Zeolite and Molecular Sieve Synthesis," *Chem. Mater.*, 4:756-768 (1992).

de Moor, P-P.E.A. et al., "Imaging the Assembly Process of the Organic-Mediated Synthesis of a Zeolite," *Chem. Eur. J.*, 5(7):2083-2088 (1999).

Degnan, T.F. et al., "History of ZSM-5 Fluid Catalytic Cracking Additive Development at Mobile," *Microporous Mesoporous Mater.*, 35-36:245-252 (2000).

de A.A. Soler-Illia, Galo, J. et al., "Chemical Strategies to Design Textured Materials from Microporous and Mesoporous Oxides to Nanonetworks and Hierarchical Structures," *Chem. Rev.*, 102:4093-4138 (2002).

Geidel, E. et al., "Characterization of Mesoporous Materials by Vibrational Spectroscopic Techniques," *Microporous and Mesoporous Mater.*, 65:31-42 (2003).

González-Peña, V. et al., "Thermally Stable Mesoporous Alumina Synthesized with Non-ionic Surfaces in the Presence of Amines," *Microporous and Mesoporous Materials*, 44-45, pp. 203-210 (2001).

Harding, R.H. et al., "New Developments in FCC Catalyst Technology," *Appl. Catal. A:Gen.*, 221:389-396 (2001).

Huang, L. et al., "Investigation of Synthesizing MCM-41/ZSM Composites," *J. Phys. Chem. B*. 104:2817-2823 (2000).

Karlsson, A. et al., "Composites of Micro- and Mesoporous Materials: Simultaneous Syntheses of MFI/MCM-41 Like Phases by a Mixed Template Approach," *Miscroporous and Mesoporous Mater.*, 27:181-192 (1999).

Kloestra, K.R. et al., "Mesoporous Material Containing Framework Tectosilicate by Pore-Wall Recrystallization," *Chem. Commun.*, 23:2281-2282 (1997).

Lee, H. et al., "Materials Science: On the Synthesis of Zeolites," *Science Week*, downloaded from http://www.scienceweek.com/2003/sa031031-1.htm on Apr. 23, 2005, 5 pgs.

Linssen, T. et al., "Mesoporous Templated Silicates: An Overview of Their Synthesis, Catalytic Activation and Evaluation of the Stability," *Advances in Colloid and Interface Science*, 103:121-147 (2003).

Liu, Y. et al., "Steam-Stable MSU-S Aluminosilicate Mesostructures Assembled from Zeolite ZSM-5 and Zeolite Beta Seeds," *Angew. Chem. Int. Ed.*, 7:1255-1258 (2001).

Liu, Y. et al., "Aluminosilicate Mesostructures with Improved Acidity and Hydrothermal Stability," *J. Mater. Chem.*, 12:3179-3190 (2002).

Lyons, D.M. et al.,"Preparation of Ordered Mesoporous Ceria with Enhanced Thermal Stability," *The Journal of Materials Chemistry*, vol. 12, pp. 1207-1212 (2002).

On, D.T. et al., "Large-Pore Mesoporous Materials with Semi-Crystalline Zeolitic Frameworks," *Angew. Chem. Int. Ed.*, 17:3248-3251 (2001).

Park, D.W. et al., "Catalytic Degradation of Polyethylene Over Solid Acid Catalysts," *Polym. Degrad. Stabil.*, 65:193-198 (1999).

Scherzer, J., "Octane-Enhancing Zeolitic FCC Catalysts—Scientific and Technical Aspects," *Marcel Dekker, Inc.*, 42 pgs. (1990).

Storck, S. et al., "Characterization of Micro- and Mesoporous Solids by Physisorption Methods and Pore-Size Analysis," *Applied Catalysts A: Gen.* 17:137-146 (1998).

Tao et al., "Mesopore-Modified Zeolites: Preparation, Characterization, and Applications," *Chem. Rev.*, vol. 106, pp. 896-910 (2006).

Triantafyllidis et al., "Gas-oil Cracking Activity of Hydrothermally Stable Aluminosilicate Mesostructures (MSU-S) Assembled from Zeolite Seeds: Effect of the Type of Framework Structure and Porosity," *Catalyst Today*, vol. 112, pp. 33-36 (2006).

Yang, P. et al., "Generalized Syntheses of Large-Pore Mesoporous Metal Oxides with Semicrystalline Frameworks," *Nature*, 396:152-155 (1998).

Ying, J.Y. et al., "Synthesis and Applications of Supramolecular-Templated Mesoporous Materials," *Angew. Chem. Int. Ed.*, 38:56-77 (1999).

* cited by examiner

METHODS FOR MAKING MESOSTRUCTURED ZEOLITIC MATERIALS

RELATED APPLICATION

This application claims the benefit of and priority to the Spanish Patent Application No. 200603127 entitled "Methods for Making Mesostructured Zeolitic Materials" filed on Dec. 7, 2006, the entirety of which is incorporated by reference herein.

FIELD OF THE INVENTION

The invention generally relates to methods for a making a mesostructure on a scale suitable for commercial production.

BACKGROUND OF THE INVENTION

Methods for making mesostructured zeolites having long-range crystallinity, also described as full crystallinity, have been described. In accordance with such prior methods, a fully crystalline inorganic material is exposed to a pH controlled medium and a surfactant in the presence of a quantity of solution suitable to substantially suspend the zeolite in a solution. The zeolite suspension is put under time and temperature conditions to form a plurality of mesopores having a controlled cross sectional area within the fully crystalline inorganic material.

Equipment (e.g., processing vessels) that can be employed for producing mesostructures for commercial production (i.e., mass production) have limited capacity. Thus, scale up for commercial production of mesostructures can be limited by the quantity of solution required to make the transformation to a mesostructure from an inorganic material (i.e., the processing vessels have limited storage capacity). The success of mass production scale up of methods that suspend the zeolite in a quantity of solution is limited due, in part, to the quantity of solution. For example, the quantity of solution that suspends the inorganic material limits the amount of mesostructure that can be produced during production, by, for example, batch production processes. In accordance with the scale up of such methods, the quantity of mesostructured material that can be made is limited by the capacity of a vessel (e.g., a closed vessel A). For example, a quantity of solution that is necessary to substantially suspend the zeolite material limits the quantity of raw zeolite to be converted that will fit into the closed vessel A. In order to improve the production capacity, an increased factory size including larger vessels can be built, however, an increased factory size, the required time to build a new factory, and the associated costs are prohibitive. Thus, the potential economic viability of scaling up methods requiring suspension of the zeolite in a solution is limited.

SUMMARY OF THE INVENTION

Surprisingly, in accordance with an improved method of making a mesostructure, it has been discovered that a pH controlling substance and/or surfactant can be employed together with a lesser quantity of solution. The lesser quantity of solution is significantly less, e.g., an order of magnitude less than previously used and believed to be required to make a mesostructure. Specifically, only a quantity of solution sufficient to dissolve the pH controlling substance and/or substantially dissolve the surfactant without substantial excess solution can be employed to make the transformation from an inorganic material having long-range crystallinity to a mesostructure having long-range crystallinity. The improved method provides a mesostructure having the desired characteristics of prior produced mesostructures formed by methods employing a quantity of solution suitable to suspend the raw inorganic material having long-range crystallinity. Thus, the pH controlling substance and/or surfactant are at a higher concentration, relative to prior described methods, because a lesser quantity of solution is employed.

In accordance with the improved method, the quantity of solution that is employed is a quantity of solution necessary to dissolve and/or substantially dissolve the required ingredients without substantial excess solution. In one embodiment, the quantity of solution that is required is the quantity necessary to provide hydrothermal conditions under, for example, hydrothermal pressure. For example, the quantity of solution that is provided is sufficient to boil under the temperature and time conditions employed in accordance with the method (e.g., in a closed vessel). The quantity of solution that is required is sufficient to dissolve the pH controlling substance and/or substantially dissolve the surfactant without substantial excess solution. The time and temperature conditions employed are selected to define, in the inorganic material, a plurality of mesopores. In accordance with the improved method, the raw inorganic material having long-range crystallinity is exposed to concentrated reactants (e.g., a quantity of solution sufficient to dissolve a pH controlling substance and/or at least partially or substantially dissolve a surfactant) that have a consistency similar to and can be described as a thick slurry or a gel. Prior methods of making mesostructures having long-range crystallinity suspend the inorganic material having long-range crystallinity in dilute reactants (e.g., a suspension of a pH controlling medium and a surfactant) that have a consistency similar to and can be described as a light slurry.

The lesser quantity of required solution enables an increase in the quantity of raw zeolite that can be transformed into a mesostructure within a vessel, for example the closed vessel A. Thus, in a process, e.g., in a batch process, the quantity of mesostructure that is made in a closed vessel A under thick slurry conditions is increased relative to more dilute light slurry methods. The improved method of making a mesostructure enables available processing equipment to be employed thereby saving the time and associated costs required to build new equipment and/or processing facilities.

In one aspect, the invention relates to a method of making a mesostructure. The method includes exposing an inorganic material having long-range crystallinity to a solution including a pH controlling substance and a surfactant and adding a quantity of a solution sufficient to dissolve the pH controlling substance without substantial excess solution. The method includes controlling exposing the inorganic material to the pH controlling substance and controlling adding the quantity of a solution sufficient to dissolve the pH controlling substance under a set of time and temperature conditions to define, in the inorganic material, a plurality of mesopores having a controlled cross sectional area forming a mesostructure having long-range crystallinity.

In one embodiment, the inorganic material is simultaneously exposed to the pH controlling substance and the surfactant. In another embodiment, the inorganic material is sequentially exposed to the pH controlling substance and the surfactant resulting in the solution including the pH controlling substance and the surfactant.

In one embodiment of the method the inorganic material having long-range crystallinity is exposed to a pH controlling substance and a surfactant. A quantity of a solution sufficient to dissolve the pH controlling substance and substantially dissolve the surfactant without substantial excess solution is added. The method includes controlling exposing the inorganic material to the pH controlling substance and the surfactant and controlling adding the quantity of a solution sufficient to dissolve the pH controlling substance and substantially dissolve the surfactant without substantial excess solution under a set of time and temperature conditions to define, in the inorganic material, a plurality of mesopores having a controlled cross sectional area forming a mesostructure having long-range crystallinity.

In one embodiment, the ratio of the solution to the inorganic material ranges from about 10 ml/g to about 0.1 ml/g (i.e., about 10 ml of the solution to 1 gram of inorganic material to about 0.1 ml of the solution to 1 gram of inorganic material). In one embodiment, the quantity of the solution produces an autogenous pressure in a closed vessel under the set of time and temperature conditions employed in the method. An autogenous pressure is a self-generated pressure created in a closed vessel when, for example, a volume of solution is placed in a closed vessel and upon increasing the temperature the pressure increases due to the direct relationship between temperature and pressure. The solution can be, for example, aqueous or contain other solvents, for example, an organic solvent or an inorganic solvent. In one embodiment, the pH controlling substance is a base.

In one embodiment, the solution and the time and temperature conditions produce a mesostructure having substantially the same hydrothermal stability as the inorganic material. In one embodiment, hydrothermal stability of the inorganic material is substantially the same as measured by comparing a property of the inorganic material prior to exposure to steam with the same property of the inorganic material after exposure to steam and hydrothermal stability of the mesostructure is measured by comparing the property of the mesostructure prior to exposure to steam with the same property of the mesostructure after exposure to steam. The property can be one or more of catalytic activity, conversion, selectivity, acidity, crystallinity, porosity, and connectivity.

In one embodiment, each of a mesostructure having long-range crystallinity and an inorganic material having long-range crystallinity is employed to convert a feedstock oil to products including, for example, gasoline, liquid petroleum gas, light cycle oil (e.g., diesel), and heavy cycle oil. Conversion is measured in, for example, weight percent. The difference between mesostructure having long-range crystallinity conversion prior to and after exposure to steam is substantially the same as the difference between inorganic material having long-range crystallinity conversion prior to and after exposure to steam. As such, as a result of exposure to steam, the conversion capacity of the inorganic material and the mesostructure were reduced by substantially the same amount. In this way, the mesostructure has substantially the same hydrothermal stability as the inorganic material. For example, in one embodiment, as a result of exposure to steam, the reduction in conversion of the mesostructure has a value of, for example, between about 15% less than and about 15% greater than, between about 10% less than and about 10% greater than, and between about 5% less than and about 5% greater than the reduction in conversion of the inorganic material after being exposed to steam. The mesostructure has a value of from about 55% to about 100%, from about 60% to about 80%, or about 65% conversion after exposure to steam as prior to exposure to steam.

In one embodiment, the invention relates to a mesostructure produced by: exposing an inorganic material having long-range crystallinity to a solution having a pH controlling substance and a surfactant under time and temperature conditions sufficient to define, in the inorganic material, a plurality of mesopores having a controlled cross sectional area forming a mesostructure having long-range crystallinity. The quantity of the solution having a pH controlling substance and the surfactant is sufficient to dissolve the pH controlling substance and substantially dissolve the surfactant without substantial excess solution. The controlled cross sectional area has a diameter ranging from about 2 nm to about 60 nm, for example. In one embodiment, the controlled cross sectional area has a diameter and the diameter has a controlled distribution range. In one embodiment, the plurality of mesopores have a pore volume and the pore volume is controlled, for example, the pore volume is from about 0.05 cc/g to about 2 cc/g. The plurality of mesopores have a pore arrangement and the pore arrangement can be: controlled, organized, or random, for example. In one embodiment, a wall thickness between adjacent mesopores is from about 1 nm to about 50 nm.

In another embodiment, the mesostructure made according to the method has a chemical composition framework substantially the same as the chemical composition framework of the inorganic material prior to defining the plurality of mesopores. In one embodiment, the mesostructure has a connectivity substantially the same as the connectivity of the inorganic material prior to defining the plurality of mesopores. In another embodiment, the inorganic material is a zeolite and the mesostructure has a tetracoordinated aluminum/octacoordinated aluminum ratio substantially the same as the tetracoordinated aluminum/octacoordinated aluminum ratio of the zeolite prior to defining the plurality of mesopores. In one embodiment, the mesostructure has a crystal unit cell substantially the same as the crystal unit cell of the inorganic material prior to defining the plurality of mesopores. For example, the crystal unit cell of the inorganic material is a value within the range of from about 24.20 Angstroms to about 24.50 Angstroms and the mesostructure crystal unit cell has a value within the range of from about 24.20 Angstroms to about 24.50 Angstroms.

These embodiments of the present invention, other embodiments, and their features and characteristics, will be apparent from the description, drawings and claims that follow.

BRIEF DESCRIPTION OF THE DRAWINGS

The foregoing and other objects, feature and advantages of the invention, as well as the invention itself, will be more fully understood from the following illustrative description, when read together with the accompanying drawings which are not necessarily to scale.

DETAILED DESCRIPTION OF THE INVENTION

Figure 1:
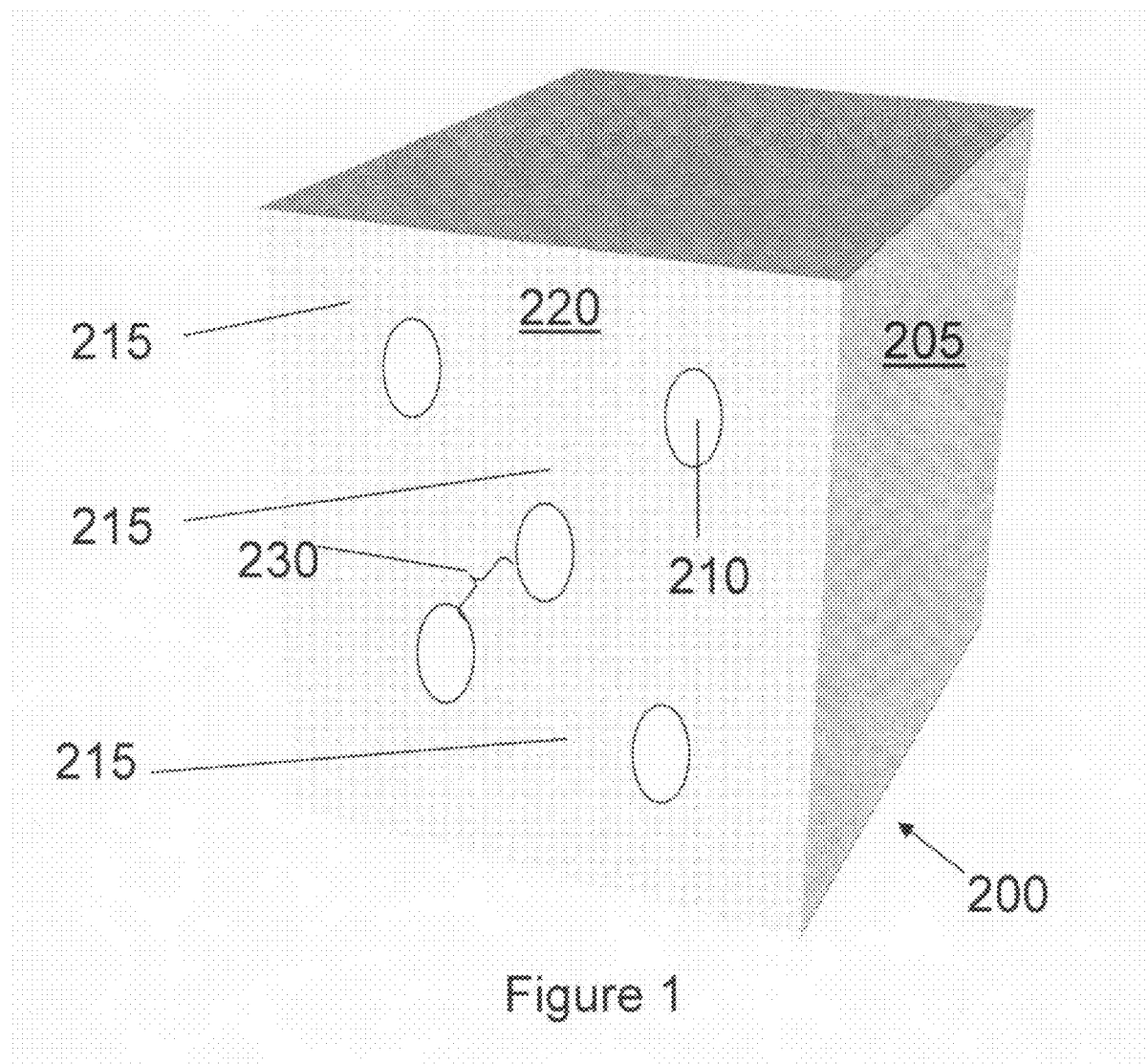
FIG. 1 is a schematic illustration of a mesostructured zeolite having long-range crystallinity.

Applicants have discovered how make mesostructured zeolites utilizing solutions with increased viscosity and, accordingly, reduced quantities of liquid. In accordance with the improved method of making a mesostructure, a quantity of solution that is employed is a quantity of solution necessary to dissolve and/or substantially dissolve the required ingredients without substantial excess solution. The inorganic material having long-range crystallinity is exposed to concentrated conditions having a consistency (e.g., a viscosity) similar to a thick slurry or a gel. Prior methods of making mesostructures having long-range crystallinity suspend the inorganic material having long-range crystallinity in dilute conditions having a consistency similar to a light slurry.

The synthesis of mesostructures having long-range crystallinity is applicable to a wide variety of materials. Mesostructures having long-range crystallinity can be formed from any of a number of inorganic materials, including, for example a metal oxide, a zeolite, a zeotype, aluminophosphate, gallophosphate, zincophosphate, titanophosphate, faujasite (FAU), mordenite (MOR), ZSM-5 (MFI), or CHA, or any combination of these. In addition, mesostructures can be formed from zeolite-like materials, which represent a growing family of inorganic and organic/inorganic molecular sieves. Long-range crystallinity includes all solids with one or more phases including repeating structures, referred to as unit cells, that repeat in a space for at least 10 nm. A long-range crystalline zeolite structure may have, for example, single crystallinity, mono crystallinity, or multi crystallinity. Multi crystallinity includes all solids having more than one phase having repeating structures, referred to as unit cells, that repeat in a space for at least 10 nm. It is expected that any crystalline inorganic material having long-range crystallinity would have a similar structure, would similarly be produced, and/or would similarly be employed where, for example, a zeolite, a fully crystalline zeolite, a zeolite having long-range crystallinity, or zeolites are described.

In one embodiment, the inorganic material is a zeolite. The zeolite is exposed to a solution including a pH controlling substance and a surfactant. A quantity of the solution sufficient to dissolve the pH controlling substance and at least substantially dissolve the surfactant without substantial excess solution is added to the zeolite. During the step in which the pH controlling substance is dissolved in the quantity of solution, the pH controlling substance is the solute and the solvent is the quantity of solution sufficient to dissolve the pH controlling substance without substantial excess solution. During this dissolving step the solute (the pH controlling substance) is dissolved in the solvent (the quantity of solution). The solute (the pH controlling substance) can be solid, liquid, or gaseous. Examples of suitable solvents include, for example, an aqueous solution (e.g., water), an organic solvent, or an inorganic solvent. In one embodiment, the pH controlling substance is a base.

During the step in which the surfactant is substantially dissolved in the quantity of solution, the surfactant is the solute and the solvent is the quantity of solution which is sufficient to substantially dissolve the surfactant without substantial excess solution. In this dissolving step the solute (the surfactant) is substantially dissolved in the solvent (the quantity of solution) thereby creating a mixture. The solute (the surfactant) can be solid, liquid, or gaseous. In one embodiment, a portion of the surfactant remains out of solution in, for example, solid form. In another embodiment, the surfactant is dissolved in the quantity of solution such that all of the surfactant is in solution. In one embodiment, there is a single quantity of solution that dissolves the pH controlling substance and substantially dissolves the surfactant without substantial excess solution. In another embodiment, the surfactant is substantially dissolved in the solvent (the quantity of solution) upon exposure to temperature conditions.

The order of addition of the pH controlling substance, the surfactant, and/or the quantity of solution can be immaterial to the process. In one embodiment, the pH controlling substance is in a liquid medium and the pH controlling substance is at least partially in solution with the liquid medium. The pH controlling substance in the liquid medium provides a portion of the quantity of solution sufficient to dissolve the pH controlling substance and the remaining quantity of solution (e.g., liquid) is added separately. Alternatively, the pH controlling substance is in a liquid medium and the quantity of liquid in the liquid medium is sufficient to dissolve the pH controlling substance without substantial excess solution. In still another embodiment, the pH controlling substance is in a liquid medium that provides a portion of the quantity of solution sufficient to dissolve the pH controlling substance and a portion of the quantity of solution sufficient to substantially dissolve the surfactant and the remaining quantity of solution (e.g., liquid) is added separately. In yet another embodiment, the pH controlling substance is in solution together with the quantity of solution sufficient to dissolve the pH controlling substance and substantially dissolve the surfactant without substantial excess solution.

In another embodiment, the surfactant is in a liquid medium that provides a portion of the quantity of solution sufficient to substantially dissolve the surfactant and the remaining quantity of solution is added separately. Alternatively, the surfactant is in a liquid medium that includes the quantity of solution sufficient to substantially dissolve the surfactant without substantial excess solution. In still another embodiment, the surfactant is in a liquid medium and provides a portion of the quantity of solution sufficient to substantially dissolve the surfactant and a portion of the quantity of solution sufficient to dissolve the pH controlling substance and the remaining quantity of solution (i.e., liquid) is added separately. In another embodiment, the surfactant is in a liquid medium together with the quantity of solution sufficient to substantially dissolve the surfactant and dissolve the pH controlling substance without substantial excess solution.

The zeolite exposure to a solution comprising a pH controlling substance and a surfactant is controlled under a set of time conditions and temperature conditions. The quantity of solution is sufficient to dissolve the pH controlling substance and substantially dissolve the surfactant without substantial excess solution. The zeolite is exposed to the solution including the pH controlling substance and the surfactant under time and temperature conditions sufficient to define in the zeolite a plurality of mesopores. The plurality of mesopores have a controlled cross sectional area. The plurality of mesopores are defined in or formed in to the zeolite to form a mesostructure having long-range crystallinity. In one embodiment, the mesopores defined in the zeolite have a controlled pore size distribution to form a mesostructure having long-range crystallinity.

FIG. 1 is a schematic illustration of a mesostructure having long-range crystallinity 200 that is made according to the improved method. The mesostructure 200 features a zeolite structure 205 having long-range crystallinity with a plurality of mesopores 210 penetrating throughout the volume of the zeolite structure 205. The portion 215 of the mesostructure 200 that surrounds each mesopore 210 has long-range crystallinity. The pore wall or interior wall between adjacent mesopores has a wall thickness 230. As illustrated in FIG. 1, the portion 215 of the mesostructure and the mesopores 210 are viewed from a side 220 of the zeolite structure 205. Although not depicted in this schematic illustration, the mesopores can be viewed from other sides of the mesostructure 200. In one embodiment, the mesostructure 200 has substantially the same hydrothermal stability as the inorganic material from which it was made.

The pH controlling substance can be, for example, a base such as tetra methyl ammonium hydroxide, $NH_4OH$, or NaOH. The pH controlling substance can be a base that when dissolved by the quantity of solution has a pH value within the range of from about 8 to about 12, or from about 9 to about 11, or alternatively, the base pH can be about 10. The strength of the base and the concentration of the base when in solution are selected to provide a pH value within the desired range. Any suitable base can be employed that has a value that falls within the desired pH range. A strong base that when in solution has, for example, a pH value within the range of from about 11 to about 14, or from about 12 to about 13, can be employed. Alternatively, the pH controlling substance can include an acid, for example, HF having, for example, a pH that in solution has a value within the range of from about 2 to about 6, or from about 3 to about 5, or at about 4. Acids may be employed for certain very stable zeolites (e.g., ZSM-5, MOR, CHA etc.). In some embodiments, after exposure to an acid the pH is increased to a pH value within the range of from about 9 to about 11 by adding a base. The pH controlling substance can be a pH value within the range of from about −2 to about 6 and from about 8 to about 14. In one embodiment, the pH has a value within the range of from about 9 to about 12 and the surfactant is a cationic surfactant. In another embodiment, the pH has a value within the range of from about −2 to about 2 and the surfactant can be a neutral surfactant, an anionic surfactant, or combination of these.

When transitioning from a method of making a mesostructure from a desired mesostructure product having a desired level of mesoporosity as was made in dilute conditions of a light slurry (e.g., on the small or laboratory scale), to the concentrated conditions of a thick slurry (e.g., scaled up for the commercial or mass production scale), the ratio of grams of pH controlling substance to grams of inorganic material to be transformed is a key parameter that needs to be substantially maintained during the transition. Thus, to form a mesostructure having a desired level of mesoporosity as was formed from methods of making a mesostructure in which the inorganic material is suspended (e.g., light slurry) the methods of the invention (e.g., thick slurry) substantially maintain the ratio of grams of pH controlling substance to grams of inorganic material to be transformed. For comparison, to achieve a desired mesostructure product with a desired level of mesoporosity in both light slurry and thick slurry conditions, the ratio of grams of pH controlling substance to grams of inorganic material to be transformed is substantially maintained between the light slurry conditions and the thick slurry conditions. That is, a value within the range of from about one half the ratio of grams of pH controlling substance to grams of inorganic material to about double the ratio of grams of pH controlling substance to grams of inorganic material is substantially maintained.

Suitable surfactants that can be employed include cationic, ionic, neutral surfactants and/or combinations of these. Exemplary surfactants include, for example, hexadeciltrimethylammonium bromide, or cetylrimethylammonium bromide (CTAB). The quantity of surfactant is varied according to, for example, the surfactant and the zeolite that are mixed. For example, in one embodiment, the weight of surfactant is about equal to the weight of zeolite that is added to the solution. Alternatively, the weight of surfactant can be about half of the weight of zeolite added to the solution. In embodiments where a neutral surfactant is employed, for example, PLURONIC(C) (available from BASF (Florham Park, N.J.)), the pH controlling substance has a pH value within the range of from about −2 to about 2, or from about −1 to about 1, or at about 0.

The quantity of solution employed in accordance with the method is a quantity only sufficient to dissolve the pH controlling substance and/or substantially dissolve the surfactant without substantial excess solution. Excess solution is defined as the quantity that is greater than the quantity actually required to dissolve the pH controlling substance and/or substantially dissolve the surfactant. The actually required quantity of solution may be determined by the solubility of the surfactant and/or the solubility of the pH controlling medium in the mixture. In thick slurry conditions the ratio of the milliliters of solution to the grams of inorganic material having long-range crystallinity to be transformed into a mesostructure having long-range crystallinity can have a value within the range of from about 10 ml/g to about 0.1 ml/g, from about 7 ml/g to about 1 ml/g, from about 4 ml/g to about 1.5 ml/g, about 2 ml/g to about 0.15 ml/g, or about 5 ml/g.

During a transformation to a mesostructure having long-range crystallinity employing light slurry conditions excess solution occupies vessel space thereby reducing the production capacity relative to thick slurry conditions, because less inorganic material to be transformed can fit within the vessel. Light slurry conditions have a ratio of milliliters of solution to grams of inorganic material having long-range crystallinity to be transformed equal to or greater than about 25 ml/g. Thus, thick slurry conditions employ significantly less solution relative to light slurry conditions, more specifically, thick slurry conditions employ at least less than half the quantity of solution per gram of inorganic material to be transformed compared to light slurry conditions.

The quantity of solution (e.g., liquid) employed in the thick slurry conditions will vary depending on, for example, the solubility of the pH controlling substance, and/or the solubility of the surfactant, and/or the quantity of inorganic material to be transformed for a given application. Where the quantity of solution theoretically required to dissolve the pH controlling substance and/or substantially dissolve the surfactant without any excess solution is 100 ml, then a value of from about 100 ml to about 120 ml, or from about 105 ml to about 115 ml, or about 110 ml (e.g., a value of from about 0% to about 20%, or from about 5% to about 15%, or about 10% excess) is defined as a quantity of solution sufficient to dissolve and/or substantially dissolve without substantial excess solution.

In one embodiment, the quantity of solution provided in the improved method is a limited excess amount of the solution required to dissolve the pH controlling substance and/or substantially dissolve the surfactant. The limited excess amount of the solution required can be a value within the range of from about 0% to about 20% greater than the amount of solution required to dissolve the pH controlling substance and/or substantially dissolve the surfactant.

In another embodiment, the quantity of solution provided in the improved method is a quantity of solution suitable to provide a saturated solution when dissolving the pH controlling substance and/or when dissolving the surfactant. The pH controlling substance and/or the surfactant can be dissolved and the solution is thereby saturated upon exposure to time and temperature conditions in accordance with the improved method. The solution can have a saturation value within the range from about 70% to about 100% saturated.

In another embodiment, the quantity of the solution is just sufficient to dissolve the pH controlling substance and/or substantially dissolve the surfactant. The quantity of solution just sufficient to dissolve the pH controlling substance and/or substantially dissolve the surfactant can be an amount theoretically required to dissolve and/or substantially dissolve the ingredients. In one embodiment, the quantity of the solution is the theoretically required amount plus an excess amount having a value within the range of from about 0% to about 20%, from about 5% and about 15%, and about 10%.

In one embodiment, the quantity of solution is enough to dissolve the pH controlling substance and/or substantially dissolve the surfactant without substantial excess solution and also provide steam under hydrothermal conditions. For example, the quantity of solution dissolves the pH controlling substance and/or substantially dissolves the surfactant without substantial excess solution and provides enough solution to provide and/or produce autogenous pressure (e.g., self-generated pressure). The solution (e.g., an aqueous solution) produces autogenous pressure under hydrothermal conditions in, for example, a closed vessel. In one embodiment, the quantity of solution that is added is enough to dissolve the pH controlling substance and substantially dissolve the surfactant without substantial excess solution this quantity of solution also produces an autogenous pressure. Autogenous pressure is a self-generated pressure created in a closed vessel. Autogenous pressure is created when, for example, a volume of solution is placed in a closed vessel and the temperature is increased under such conditions the pressure within the closed vessel increases due to the direct relationship between temperature and pressure. The solution can be, for example, aqueous (e.g., contain water) or include other solvents, for example, an organic solvent and/or an inorganic solvent. Where the quantity of solution theoretically required is 100 ml then a value of from about 100 ml to about 120 ml, or from about 105 ml to about 115 ml, or about 110 ml (e.g., a value of from about 0% to about 20%, or from about 5% to about 15%, or about 10% excess) is a quantity of solution sufficient to dissolve the pH controlling substance and substantially dissolve the surfactant and this quantity of solution produces autogenous pressure without substantial excess solution.

Generally, the time and temperature conditions are related such that a higher temperature requires a shorter period of time to achieve a desired mesoporosity in the zeolite resulting in a certain mesostructure as compared to a lower temperature, which would require a relatively longer period of time to achieve the same mesoporosity. Because time and temperature are related, any suitable combination of time and temperature may be employed when hydrothermally treating the mixture. For example, the temperature ranges from a temperature value within the range of from about room temperature to about 60° C., alternatively, the temperature ranges from a temperature value within the range of from about 100° C. to about 200° C. In one embodiment, the temperature has a value of about 100° C. or greater and the controlled temperature conditions take place under hydrothermal conditions, for example, in a sealed reactor and autogenous pressure is created within the sealed reactor.

The time period ranges from a time value within the range of about one hour to about two weeks. The mixture can be held at room temperature and stirred for a time value within the range of from about 1 day to about 1 week. Alternatively, the mixture is hydrothermally treated. In one embodiment, the mixture is hydrothermally treated at about 120° C. for a time period having a value of from about 4 hours to about 1 week. During hydrothermal treatment the mixture can be stirred by, for example, rotating the vessel (i.e., rotating a sealed reactor or an autoclave). Alternatively or in addition the contents of the vessel can be stirred by employing one or more stirrer inside the vessel to stir the mixture during the hydrothermal treatment. Stirring the mixture avoids sedimentation and improves distribution of the mixture within the vessel.

The mixture is hydrothermally treated for a period of time that is selected to allow the zeolite having long-range crystallinity to form a plurality of mesopores having a controlled cross sectional area forming a mesostructure having long-range crystallinity. A desired mesostructure can be formed under the above-described conditions, for example, a H-Y [MCM-41] is a mesostructure of an acidic form of faujasite (i.e., H-Y) having long-range crystallinity and having a hexagonal mesopore arrangement (i.e., [MCM-41]). Similarly, a H-Y[MCM-48] is a mesostructure of an acidic form of faujasite having long-range crystallinity and having a cubic pore arrangement. Likewise, a H-Y[MCM-50] is a mesostructure of an acidic form of faujasite having long-range crystallinity and having a lamellar pore arrangement, etc.

The mesopore size and architecture may also be conveniently tuned by the use of surfactants with different aliphatic chain lengths, non-ionic surfactants, triblock copolymers, swelling agents, etc. For example, use of a surfactant with longer chain length increases pore size and conversely, use of surfactants with a shorter chain length decreases pore size. For example, use of a swelling agent will expand the surfactant micelles. Any of these mesopore size and mesostructure architecture altering properties may be used either alone or in combination. Also, post-synthesis treatments (e.g., silanation, grafting, surface functionalization, ion-exchange, immobilization of homogeneous catalysts and deposition of metal nanoclusters) could be employed to further improve the textural properties of the materials and/or modify their surface chemistry.

The method of making a mesostructure employing concentrated conditions (i.e., from a thick slurry) improves on the material cost, production efficiency, and ability to scale up methods of making mesostructures having long-range crystallinity.

Figure 2:
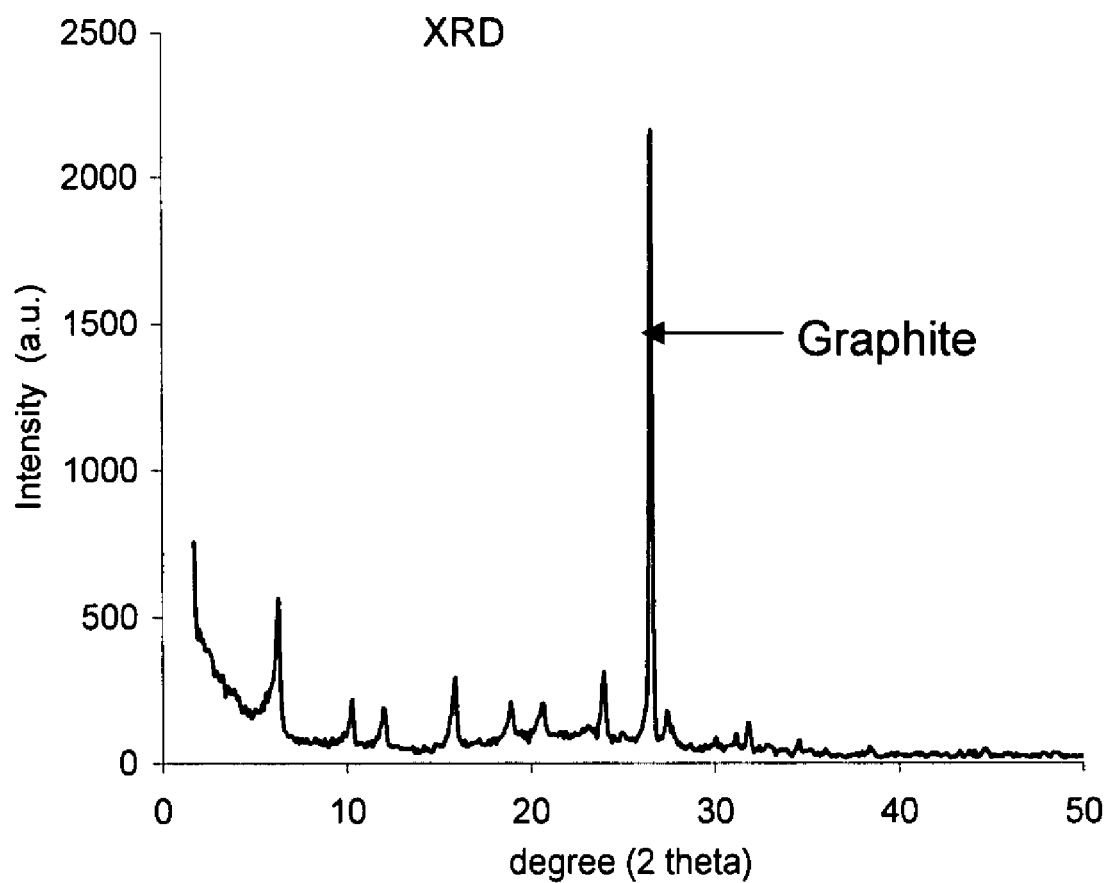
FIG. 2 depicts the x-ray diffraction pattern of a mesostructured zeolite prepared by exposing the zeolite USY to a method of making a mesostructure employing concentrated conditions (i.e., in a thick slurry). Graphite is used as an internal standard in the x-ray diffraction pattern.

FIG. 2 is an x-ray diffraction pattern of a mesostructured zeolite prepared according to the methods of the invention employing concentrated conditions (i.e., from a thick slurry). The zeolite USY having long-range crystallinity was converted to a mesostructure having long-range crystallinity according to the concentrated methods disclosed herein. Specifically, the zeolite USY was exposed to solution including a pH controlling substance and a surfactant and the quantity of solution is sufficient to dissolve the pH controlling substance and substantially dissolve the surfactant without substantial excess solution under a set of time and temperature conditions sufficient to define, in the zeolite USY, a plurality of mesopores having a controlled cross sectional area to form a mesostructure having long-range crystallinity. The x-ray diffraction peaks indicate that zeolitic long-range crystallinity of USY is maintained in the mesostructure having long-range crystallinity. Materials that do not have zeolitic long-range crystallinity show x-ray peaks only at low angles.

The very intense peak at 26.2 (degree 2 theta) is graphite, which is employed as an internal standard that enables alignment of the intensity peaks along the x-axis (degrees 2 theta) should the x-ray diffraction pattern shift during the test. Thus, by aligning the data so that the internal standard, graphite, is at 26.2 (degrees 2 theta) then the pattern of the mesostructured zeolite is similarly properly positioned along the x-axis (degrees 2 theta). Referring still to FIG. 2, the peaks at low angles are very broad, ranging from about 1.5 to about 3.0 degree 2 theta, as is typical of poorly ordered mesopores present in this sample mesostructure, which has non-ordered mesoporosity. Thus, the x-ray diffraction pattern of the mesostructured zeolite shows that the mesostructure has non-ordered or random meosporosity. Thus the zeolite USY having long-range crystallinity is transformed into a mesostructure having long-range crystallinity according to the method of making a mesostructure employing a thick slurry. The x-ray diffraction pattern of FIG. 2 also shows that the unit cell of the zeolite USY having long-range crystallinity is maintained when the zeolite USY is transformed under the concentrated conditions of the thick slurry into a mesostructure having long-range crystallinity. Materials that do not have zeolitic long-range crystallinity show x-ray peaks only at low angles. Here, zeolitic long-range crystallinity is maintained as is shown by the distribution of peaks in the x-ray diffraction pattern.

This indicates the crystal unit cell of zeolite USY is unchanged when the zeolite USY is exposed to the methods employing a thick slurry to make a mesostructure having long-range crystallinity. In one embodiment, the mesostructure crystal unit cell has a value within the range of from about 24.20 Angstroms to about 24.50 Angstroms.

Figure 3:
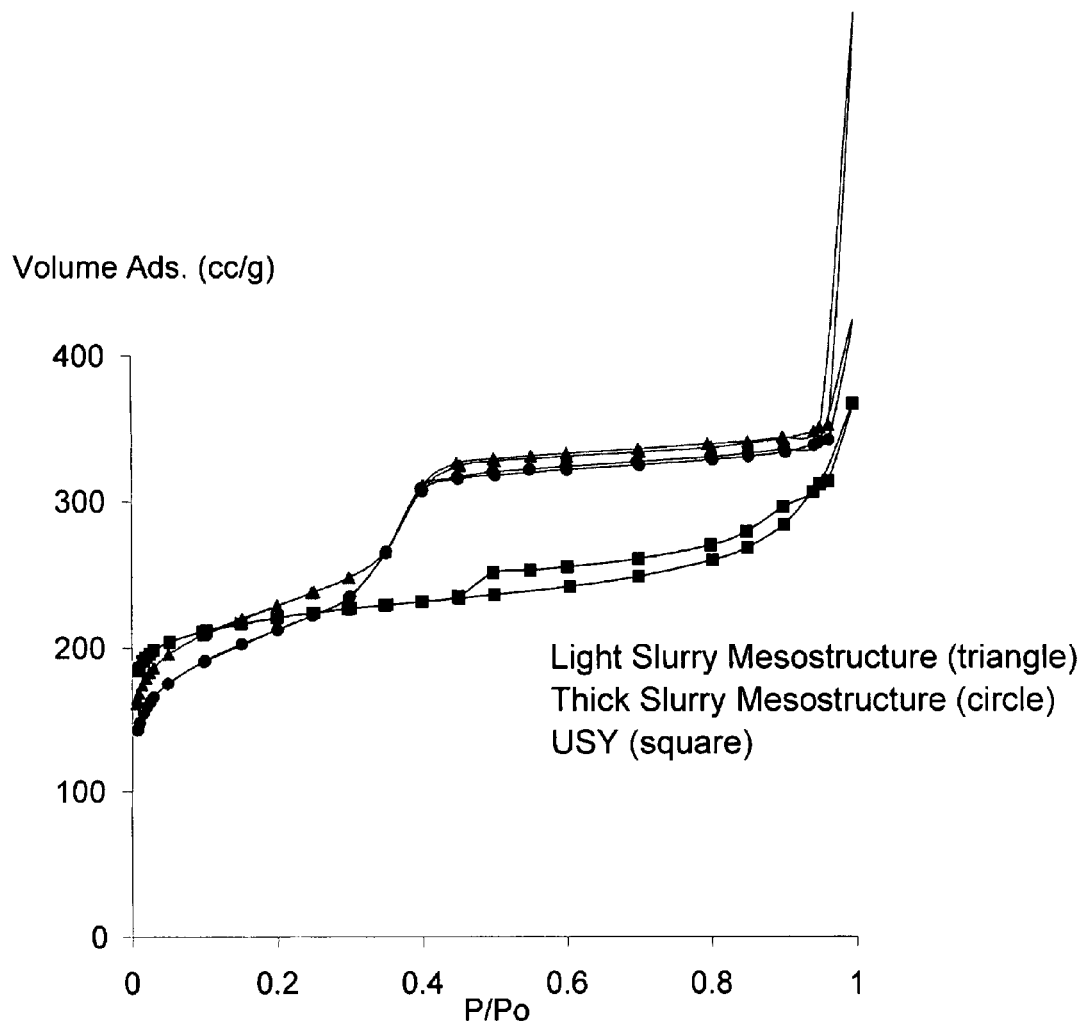
FIG. 3 is a Nitrogen adsorption isotherm at 77 K showing data for a zeolite USY having long-range crystallinity, a mesostructure having-long range crystallinity prepared from USY under dilute conditions(i.e., in a light slurry), and a mesostructure prepared from USY under concentrated conditions (i.e., in a thick slurry).

FIG. 3 is a nitrogen adsorption isotherm showing data for a raw zeolite USY having long-range crystallinity (with no added mesoporosity), a mesostructure having-long range crystallinity prepared from USY under dilute conditions (i.e., light slurry conditions), and a mesostructure having-long range crystallinity prepared from USY under concentrated conditions (i.e., thick slurry conditions). The isotherm data showing squares is the adsorption isotherm of the original zeolite USY (i.e., ultra stable Y) having long-range crystallinity prior to transformation into a material defining mesopores (i.e., a mesostructured material). The isotherm data showing triangles is the adsorption isotherm of the mesostructure having long-range crystallinity prepared from the zeolite USY under dilute conditions (i.e., light slurry conditions) in which the zeolite USY was substantially suspended in a solution of liquid, pH controlling substance, and surfactant. The isotherm data showing circles is a mesostructure having long-range crystallinity prepared from the zeolite USY under concentrated conditions (i.e., thick slurry conditions). The thick slurry conditions transform the zeolite USY into a mesostructure having long-range crystallinity by exposing the zeolite USY to a quantity of solution sufficient to dissolve the pH controlling substance and substantially dissolve the surfactant without substantial excess solution under a set of time and temperature conditions sufficient to define, in the zeolite USY, a plurality of mesopores having a controlled cross sectional area and/or a controlled pore size distribution range.

Referring still to FIG. 3, both the mesostructure having long-range crystallinity formed when suspended in dilute conditions (i.e., the light slurry mesostructure—data depicted with triangles) and the mesostructure having long-range crystallinity exposed to concentrated conditions (i.e., the thick slurry mesostructure—data depicted with circles) show incorporation of meosporosity. As shown in FIG. 3, the sharp nitrogen uptake of the volume adsorbed at higher partial pressures $P/P_0 \sim 0.3$-$0.4$ in both the light slurry mesostructure (data depicted with triangles) and the thick slurry mesostructure (data depicted with circles) shows that a similar level of mesoporosity is incorporated into the light slurry mesostructure and the thick slurry mesostructure under the differing light slurry and thick slurry conditions. Also, the sharp nitrogen uptakes at higher partial pressures ($P/P_0 \sim 0.3$-$0.4$) is a characteristic feature of mesostructured materials with narrow pore-size distribution. In this example, the quantity of mesoporosity imparted into each mesostructure made according to the light slurry (data depicted with triangles) and thick slurry processes (data depicted with circles) is a controlled quantity of mesoporosity. Note that the zeolite USY does not show the nitrogen uptake indicative of a plurality of mesopores having a controlled cross sectional area and/or a controlled pore size distribution range defined into the zeolite.

EXAMPLES

Example 1

Example 1 compares Sample 1, a mesostructure made under dilute conditions (i.e., light slurry conditions) with Sample 2, a mesostructure made under concentrated conditions (i.e., thick slurry conditions) Both Sample 1 and Sample 2 have substantially the same mesopore volume and have controlled mesoporosity.

Sample 1 has dilute conditions (i.e., light slurry conditions): 1 gram of NaOH was dissolved in 480 ml of water then 18.4 g of hexadeciltrimethylammonium bromide was substantially dissolved in the water until a clear solution was obtained. The solution was added to 16 g of USY zeolite having long-range crystallinity (CBV720 from Zeolyst Inc.) to form a suspension. The suspension was hydrothermally treated at 125° C. for 26 hours to define in the USY a plurality of mesopores having a controlled cross sectional area to form a mesostructure having long-range crystallinity. The mesostructure was filtered out then washed and dried. Finally, the mesostructure was calcined at 550° C. in nitrogen for 4 hours (ramp rate 5° C./min), and switched at 550° C. to synthetic air for 8 hours. In Sample 1 the light slurry conditions have a ratio of milliliters of solution to grams of inorganic material having long-range crystallinity to be transformed (i.e., the USY zeolite) equal to 30 ml/g.

Sample 2 has concentrated conditions (i.e., thick slurry conditions): 4 grams of NaOH was dissolved in 480 ml of water then 80 g of hexadeciltrimethylammonium bromide was substantially dissolved in the water until a clear solution was obtained. The solution was added to 80 g of USY zeolite having long-range crystallinity (CBV720 from Zeolyst Inc.) to form a mixture. The mixture was hydrothermally treated at 120° C. for 44 hours to define in the zeolite USY a plurality of mesopores having a controlled cross sectional area to form a mesostructure having long-range crystallinity. The mesostructure was filtered out, washed and dried. Finally, the sample was calcined at 550° C. in nitrogen for 4 hours (ramp rate 5° C./min), and switched at 550° C. to synthetic air for 8 hours. In Sample 2 the thick slurry conditions have a ratio of milliliters of solution to grams of inorganic material having long-range crystallinity to be transformed (i.e., the USY zeolite) equal to 6 ml/g.

Figure 4:
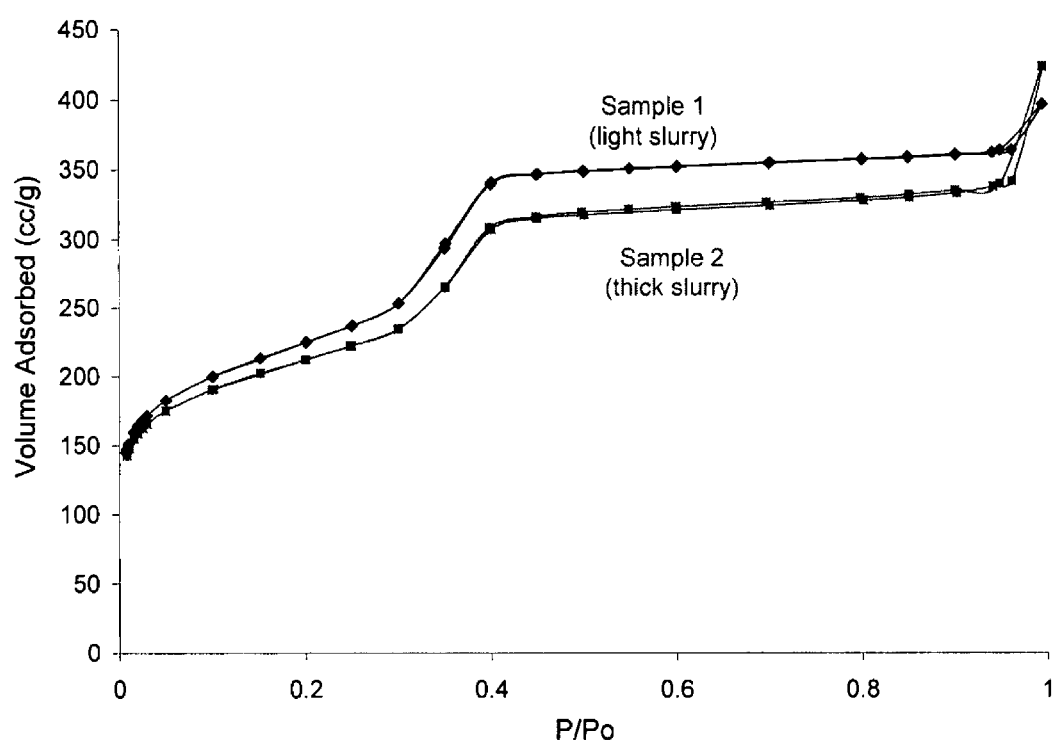
FIG. 4 depicts a Nitrogen adsorption isotherm at 77 K of two mesostructured zeolites one prepared by exposing the zeolite USY to a method of making a mesostructure employing concentrated conditions (i.e., in a thick slurry) and the other prepared by exposing the zeolite USY to a method of making a mesostructure employing dilute conditions (i.e., in a light slurry). Both mesostructures have a similar amount of mesoporosity.

FIG. 4 depicts a nitrogen adsorportion isotherm of the mesostructure produced be exposure dilute conditions also referred to as light slurry conditions (Sample 1) and a nitrogen adsorportion isotherm of the mesostructure produced by exposure to thick slurry conditions also referred to as thick slurry conditions (Sample 2). The Sample 1 mesostructure is formed by suspension of the zeolite in dilute or light slurry conditions and the Sample 2 mesostructure is formed exposing the zeolite to concentrated or thick slurry conditions. Both Sample 1 and Sample 2 are formed employing the same pH controlling substance, the same surfactant, but each employs a different quantity of solution. The sharp nitrogen uptake of the volume adsorbed at higher partial pressures $P/P_0 \sim 0.3$-$0.4$ in both the Sample 1 (i.e., light slurry) mesostructure and the Sample 2 (i.e., thick slurry) mesostructure shows that a similar level of mesoporosity is incorporated into the light slurry mesostructure and the thick slurry mesostructure under the differing light slurry and thick slurry conditions. Both the Sample 1 mesostructure and the Sample 2 mesostructure have substantially the same mesoporosity. Sample 1 has a mesopore volume of 0.18 cc/g and Sample 2 has a mesopore volume of 0.15 cc/g. Also, both the light slurry mesostructure and the thick slurry mesostructure have a controlled quantity of mesoporosity.

Example 2

Sample 3 has dilute conditions (i.e., light slurry conditions): 1.92 gram of NaOH was dissolved in 480 ml of water then 18 g of hexadeciltrimethylammonium bromide was substantially dissolved in the water until a clear solution was obtained. The solution was added to 16 g of USY zeolite having long-range crystallinity (CBV720 from Zeolyst Inc.) to form a suspension. The suspension was hydrothermally treated at 150° C. for 24 hours to define in the zeolite USY a plurality of mesopores having a controlled cross sectional area to form a mesostructure having long-range crystallinity. The mesostructure was filtered out, washed and dried. Finally, the sample was calcined at 550° C. in nitrogen for 4 hours (ramp rate 5° C./min), and switched at 550° C. to synthetic air for 8 hours. In Sample 3 the light slurry conditions have a ratio of milliliters of solution to grams of inorganic material having long-range crystallinity to be transformed (i.e., the USY zeolite) equal to 30 ml/g.

Figure 5:
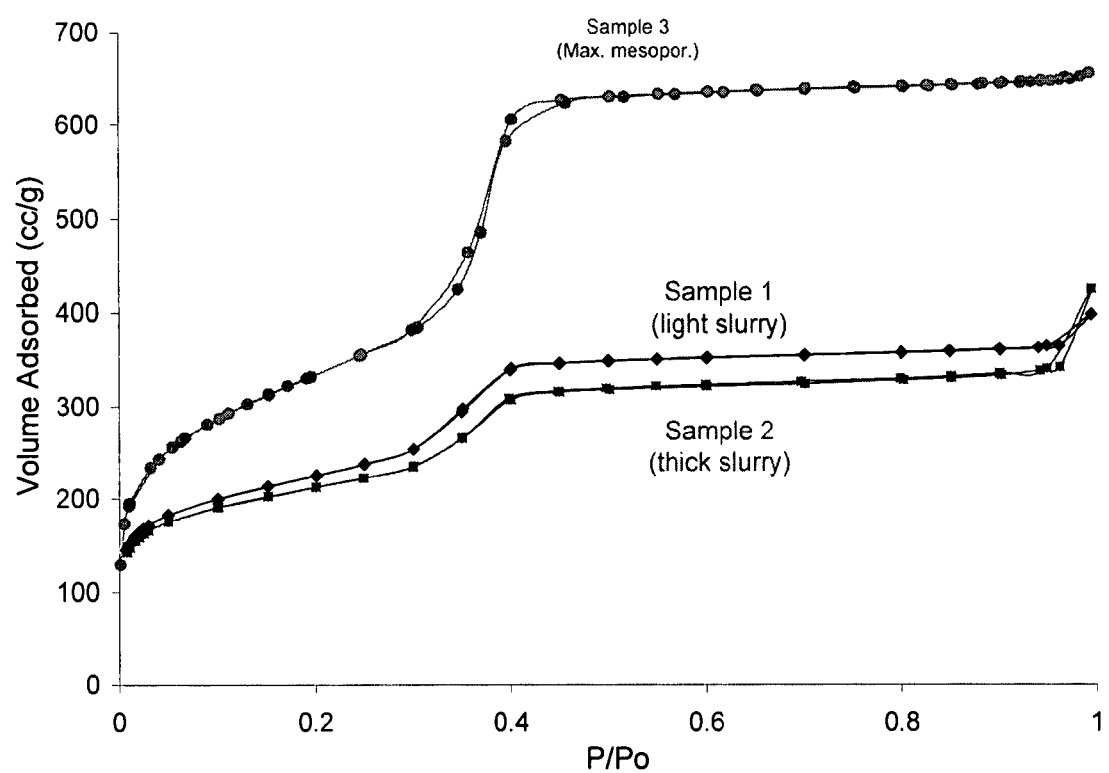
FIG. 5 depicts a Nitrogen adsorption isotherm at 77 K of three mesostructured zeolites one prepared by exposing the zeolite USY to a method of making a mesostructure employing concentrated conditions (i.e., in a thick slurry) and two prepared by exposing the zeolite USY to a method of making a mesostructure employing dilute conditions (i.e., in a light slurry). Two of the mesostructures have a similar amount of mesoporosity and one mesostructure has a greater (i.e., maximized) amount of mesoporosity.

Referring now to FIG. 5 mesostructures are formed employing the same pH controlling substance, the same surfactant, but employing different quantities of solution. Two samples are made by suspending a USY zeolite to dilute conditions or light slurry conditions to form a mesostructure (Sample 1 and Sample 3) and one sample is made by exposing a USY zeolite to concentrated conditions or thick slurry conditions to form a mesostructure (Sample 2). In Samples 1 and 2 the amount of mesoporosity is controlled and in Sample 3 the amount of mesoporosity is maximized (see Table 3).

TABLE 1

Amounts of reactants for Samples 1–3 normalized by gram of zeolite

| Sample | Type | $H_2O$ | Surfactant | NaOH | Zeolite |
|---|---|---|---|---|---|
| Sample 1 | light slurry | 30 | 1.115 | 0.0625 | 1 |
| Sample 2 | thick slurry | 6 | 1.000 | 0.0500 | 1 |
| Sample 3 | light slurry | 30 | 1.125 | 0.1200 | 1 |

TABLE 2

NaOH concentration for the Samples 1–3

| Sample | Type | NaOH concentration (M) |
|---|---|---|
| Sample 1 | light slurry | 0.052 |
| Sample 2 | thick slurry | 0.208 |
| Sample 3 | light slurry | 0.100 |

TABLE 3

Mesopore Volume for the Samples 1–3

| Sample | Mesopore Volume (cc/g) |
|---|---|
| Sample 1 | 0.18 |
| Sample 2 | 0.15 |
| Sample 3 | 0.38 |

The ratio of grams of pH controlling substance to grams of inorganic material to be transformed is a key parameter that needs to be substantially maintained from methods of making a mesostructure in which the inorganic material is suspended (e.g., light slurry see Sample 1) the methods of the invention (e.g., thick slurry see Sample 2) to provide, in a scaled up process, a desired product as was made on the small or laboratory scale. Anything between about one half and about double the ratio of grams of pH controlling substance to grams of inorganic material is substantially maintained. Here, in the thick slurry (Sample 2) the quantity of pH controlling substance, NaOH, was increased since the NaOH/zeolite ratio is the key parameter that needs to be maintained to allow for the transformation. Thus, Sample 1 which has a slightly higher NaOH/zeolite ratio (0.0625) than Sample 2 (0.0500) also has slightly more mesoporosity (FIG. 4) and a slightly higher mesopore volume. Sample 1 has a mesopore volume of 0.18 cc/g whereas Sample 2 has a mesopore volume of 0.15 cc/g. Sample 3 has a much higher NaOH/zeolite ratio (0.1200) than Sample 1 (0.0625) and Sample 2 (0.0500) and, accordingly, has a great deal more mesoporosity (FIG. 5) and Sample 3 has a relatively high mesopore volume 0.38 cc/g although the Sample 3 NaOH concentration (0.100) is lower than the NaOH concentration of Sample 2 (0.208).

The mesostructure in Sample 3 has maximum mesoporosity whereas the mesostructure in Sample 1 and the mesostructure in Sample 2 have controlled mesoporosity. Both Sample 1 and Sample 3 are made with a light slurry. Sample 1 has lower mesopore volume due to the lesser amount of base relative to the quantity of base employed in Sample 3. The quantity of base employed in Sample 1 is about half of the quantity of base employed in Sample 3 where the amount of mesoporosity was maximized.

The mesostructure in Sample 2 was made by exposure the concentrated conditions of a thick slurry. In contrast, the mesostructure in Sample 1 was made by exposure to the dilute conditions of a light slurry. In order to make the thick slurry mesostructure similar in mesoporosity to the light slurry mesostructure, the quantity of solution, here an aqueous solution containing water, was reduced while maintaining a substantially constant pH controlling substance to inorganic material ratio (the Sample 1 ratio of NaOH/zeolite is 0.0625 and the Sample 2 ratio of NaOH/zeolite is 0.0500 and this is substantially constant). The parameters of pH controlling substance to zeolite ratio and surfactant to zeolite ratio are substantially maintained to provide a mesostructure formed from thick slurry conditions that has a substantially similar mesostructure as a mesostructure formed from light slurry conditions. In this way, mesostructures made from prior described methods for making a mesostructure in which the unconverted zeolite is suspended in a dilute solution (i.e., a light slurry) can be achieved by exposure to the concentrated conditions of the method described herein (i.e., a thick slurry). Thus, solution necessary to suspend the unconverted zeolite is avoided in the thick slurry method thereby improving production capacity and costs associated with scaling up the method for commercial or mass production of mesostructured zeolites having long range crystallinity.

Example 3

Zeolites are frequently employed as fluid catalytic cracking (FCC) catalysts. FCC is a moving fluidized process in which a vaporized feed is cracked over zeolite catalyst at temperatures from between about 470° C. to about 540° C., for example. The cracking activity continuously deposits coke, a deactivating carbon, over the zeolite. Generally, coke is removed when it is burned off of the zeolite in a regeneration step that exposes the coke deposited zeolite to a temperature range of from about 700° C. to about 950° C. in a steam environment.

In order for a zeolite to provide catalytic cracking capacity after a regeneration step, the zeolite must be hydrothermally stable. A hydrothermally stable zeolite has substantially the same properties both prior to and after exposure to steam at a selected temperature. For example, a hydrothermally stable zeolite has substantially the same catalytic activity (e.g., provides substantially similar conversion) after a regeneration cycle as the zeolite had prior to a processing use that precipitated its regeneration. Similarly, a hydrothermally stable zeolite has substantially the same selectivity (e.g., the ability to process from a feed stock a desired end product) after a regeneration cycle as the zeolite had prior to a processing use that precipitated its regeneration.

In accordance with the method a plurality of mesopores having a controlled cross sectional area can form a mesostructure having long-range crystallinity where the mesostructure has substantially the same hydrothermal stability as the inorganic material. In one embodiment, hydrothermal stability of the inorganic material is measured by comparing a property of the inorganic material prior to exposure to steam with the same property of the inorganic material after exposure to steam and hydrothermal stability of the mesostructure is measured by comparing the property of the mesostructure prior to exposure to steam with the same property of the mesostructure after exposure to steam. The property can be one or more of catalytic activity, conversion, selectivity, acidity, crystallinity, porosity, and connectivity. Example 3 provides conversion data from a feedstock oil that was contacted with three catalysts USY, HTS-Meso, and Meso, and the catalysts are described below:

Inorganic Material:

USY— The zeolite CBV-720 (available from Zeolyst International, Valley Forge, Pa.), which has a silicon to aluminum ratio of 15 (Si/Al=15) and has long-range crystallinity.

USY-S' 10 grams of the zeolite USY, described above, were exposed to pure steam at a temperature of 1200° F. for 4 hours.

Hydrothermally Stable Mesostructured Inorganic Material:

HTS-Meso—The hydrothermally-stable mesostructured zeolite was made by dissolving 3.3 wt % 3 ml of $NH_4OH$ (30% $NH_3$) in 480 ml of water to form a pH controlled medium (i.e., a basic medium) and then dissolving 18.4 grams of cetyltrimethylammonium bromide (CTAB) in the pH controlled medium. Thereafter, 16 grams of the zeolite CBV-720 (available from Zeolyst International, Valley Forge, Pa.), which has a silicon to aluminum ratio of 15 (Si/Al=15) and has long-range crystallinity, was suspended therein. The suspended zeolite (a mixture of the pH controlled medium, surfactant, and zeolite) was then hydrothermally treated at 120° C. for 30 hours to define, in the zeolite CBV-720, a plurality of mesopores having a controlled cross sectional area to form a mesostructure having long-range crystallinity. The mesostructure was separated and filtered from the solution, washed in water, dried and calcined. During the drying and calcination processes the mesostructure was first exposed to $N_2$ at a temperature of up to 550° C. (the temperature increases by 5° C./min) for 4 hours and then exposed to air at 550° C. for 8 hours. The hydrothermally-stable mesostructure (HTS-Meso) has a mesoporosity of 0.15 cc/g.

HTS-Meso-S-10 grams of HTS-Meso, described above, were exposed to pure steam at a temperature of 1200° F. for 4 hours.

Non-Hydrothermally Stable Mesostructured Inorganic Material:

Meso—The non-hydrothermally stable mesostructured inorganic material was made by dissolving 2 grams of NaOH in 480 ml of water to form a pH controlled medium (i.e., a basic medium) and then dissolving 18.7 g of cetyltrimethylammonium bromide (CTAB) in the pH controlled medium. Thereafter, 16 grams of the zeolite CBV-720 (available from Zeolyst International, Valley Forge, Pa.), which has a silicon to aluminum ratio of 15 (Si/Al=15) and has long-range crystallinity, was suspended therein. The suspended zeolite was then hydrothermally treated at 120° C. for 44 hours to define, in the zeolite CBV-720, a plurality of mesopores having a controlled cross sectional area. The mesostructure was separated and filtered from the solution, washed in water, dried and calcined. During the drying and calcination processes the mesostructure was first exposed to $N_2$ at a temperature of up to 550° C. (the temperature increased by 5° C./min) for 4 hours and then exposed to air at 550° C. for 8 hours. The mesostructure (Meso) has a mesoporosity of 0.3 cc/g.

Meso-S—10 grams of HTS-Meso, described above, were exposed to pure steam at a temperature of 1200° F. for 4 hours.

In Example 3 a feedstock oil was contacted with a catalyst and converted to fractions including dry gas, Liquid Petroleum Gas (LPG), gasoline, Light Cycle Oil (LCO) also referred to as diesel, Heavy Cycle Oils (HCO), and coke. The catalysts employed in the conversion include USY, USY-S, HTS-Meso, HTS-Meso-S, Meso, and Meso-S.

The feedstock oil (vacuum gas oil that has a density of 0.9198 g/cc at 15° C.) contacted the catalyst under fluid catalytic cracking conditions in which the reaction conditions include a reaction temperature of 500° C., the ratio of catalyst to feed stock oil was 2, WHSV of 30 g/h/g, and a catalyst contact time of 60 seconds.

Three "fresh" unused catalysts USY, HTS-Meso, and Meso were employed to convert feedstock oil to the various desired fractions. Also, steaming conditions are used as a proxy for the regeneration cycles that the catalysts will undergo during processes including, for example, FCC. The three catalysts USY, HTS-Meso, and Meso were exposed to steaming conditions (i.e., pure steam at a temperature of 1200° F. for 4 hours) to provide the "steamed" or regenerated catalysts USY-S, HTS-Meso-S, and Meso-S and were also employed to convert feedstock oil to the various desired fractions. Thus, it is possible to evaluate the effect of regeneration cycles (i.e., exposure to steaming conditions) by comparing the overall conversion and selectivity for the various fractions produced in the reaction with unused catalysts with the overall conversion and selectivity for various fractions produced in the reaction with regenerated catalysts.

FIGS. 6-10 depict data compiled during Example 3 when feedstock oil is contacted with catalysts including USY, USY-S, HTS-Meso, HTS-Meso-S, Meso, and Meso-S and is converted to various product fractions. The x-axis shows the total conversion produced by contacting the feedstock oil with the catalyst (the sum of the dry gas, LPG, gasoline, LCO, HCO, and coke measured in weight percent) and the y-axis shows the selectivity for one of the fractions measured in weight percent of that fraction. In each test, the ratio of catalyst to feedstock oil is 2 grams of catalyst to 1 gram of feedstock oil.

Figure 6:
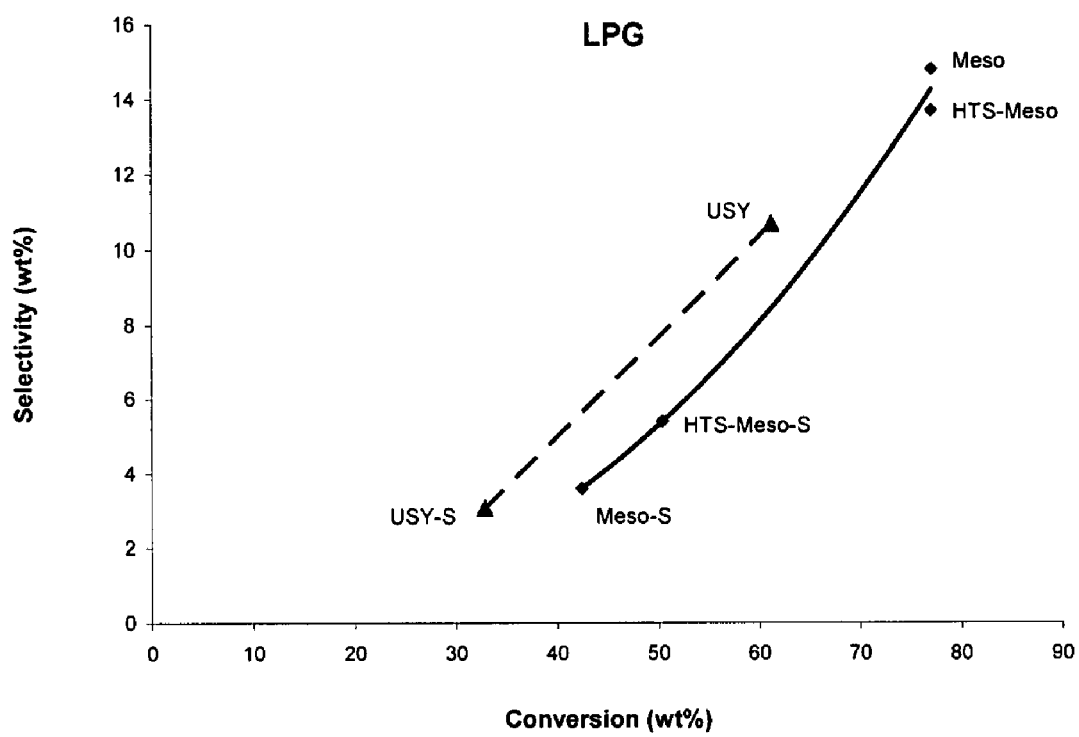
FIG. 6 depicts on the x-axis the total conversion (conversion of feedstock oil to the sum of the dry gas, Liquified Petroleum Gas (LPG), gasoline, Light Cycle Oil (LCO), Heavy Cycle Oils (HCO), and coke produced by the reaction and measured in weight percent) and on the y-axis the selectivity for the LPG fraction in weight percent.

FIG. 6 depicts the selectivity for weight percent of Liquified Petroleum Gases (LPG) on the y-axis and the total conversion (the sum of dry gas, LPG, gasoline, LCO, HCO, and coke converted from the feedstock oil measured in weight percent) on the x-axis. LPG gases include $C_3$ and $C_4$ gases such as butane, butane, propene, and propane, for example. Each data point shows, on the y-axis, the conversion of a feedstock oil to LPG gas (measured in weight percent) upon exposure to each catalyst USY, USY-S, HTS-Meso, HTS-Meso-S, Meso, and Meso-S. Each data point shows, on the x-axis, the total conversion (the sum of dry gas, LPG, gasoline, LCO, HCO, and coke converted from the feedstock oil measured in weight percent) produced by the conversion of a feedstock oil upon exposure to each catalyst USY, USY-S, HTS-Meso, HTS-Meso-S, Meso, and Meso-S. FIG. 6 shows that the fresh hydrothermally stable mesostructure HTS-Meso produces the largest amount of LPG relative to the other fresh catalysts, USY and Meso, and, similarly, the regenerated hydrothermally stable mesostructure HTS-Meso-S produces the largest amount of LPG relative to the other regenerated catalysts USY-S and Meso-S.

TABLE 4

Total Conversion of Feedstock Oil Measured in Weight %

|  | Material | Steamed Material | Material-Steamed Material |
| --- | --- | --- | --- |
| USY | 61.22 | 32.78 | 28.44 |
| HTS-Meso | 77.10 | 50.41 | 26.69 |
| Meso | 77.06 | 42.39 | 34.67 |

Table 4 compares the total conversion of feedstock oil (the total conversion is the sum of dry gas, LPG, gasoline, LCO, HCO, and coke measured in weight percent) converted from the feedstock oil by each catalyst when the catalyst is unused or fresh, i.e., USY, HTS-Meso, and Meso and after steaming USY-S, HTS-Meso-S, and Meso-S. The difference between hydrothermally stable mesostructure conversion when it is unused or fresh prior to exposure to steam (i.e., HTS-Meso is 77.10 weight percent) and hydrothermally stable mesostructure conversion after exposure to steam (i.e., HTS-Meso-S is 50.41 weight percent) is 26.69 weight percent. The difference between inorganic material having long-range crystallinity conversion when it is unused or fresh prior to exposure to steam (i.e., USY is 61.22 weight percent) and inorganic material having long-range crystallinity conversion after exposure to steam (i.e., USY-S is 32.78 weight percent) is 28.44 weight percent. Thus, the difference between mesostructure conversion prior to and after exposure to steam, i.e., 26.69, weight percent is substantially the same as the difference between inorganic material conversion prior to and after exposure to steam, i.e., 28.44 weight percent. As a result of exposure to steam, the conversion capacity of the inorganic material USY and the hydrothermally stable mesostructure HTS-Meso were reduced by substantially the same amount. In this way, the hydrothermally stable mesostructure HTS-Meso has substantially the same hydrothermal stability as the inorganic material USY. As a result of exposure to steam, the reduction in conversion of the hydrothermally stable mesostructure HTS-Meso is about 6% less than the reduction in conversion of the inorganic material USY after being exposed to steam. The hydrothermally stable mesostructure HTS-Meso-S has about 65% conversion after exposure to steam as compared to the unused or fresh hydrothermally stable mesostructure prior to exposure to steam, HTS-Meso.

Figure 7:
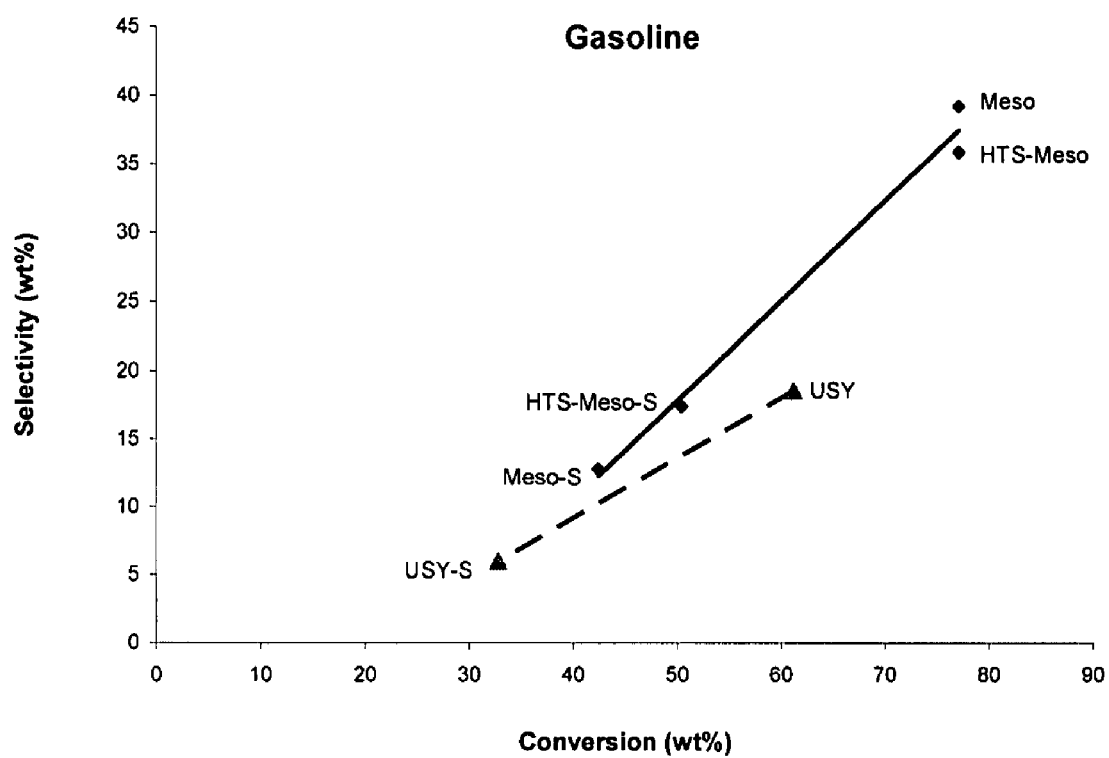
FIG. 7 depicts on the x-axis the total conversion (conversion of feedstock oil to the sum of the dry gas, LPG, gasoline, LCO, HCO, and coke produced by the reaction and measured in weight percent) and on the y-axis the selectivity for the gasoline fraction in weight percent.

FIG. 7 depicts the selectivity for weight percent of gasoline on the y-axis and the total conversion (the sum of dry gas, LPG, gasoline, LCO, HCO, and coke converted from the feedstock oil measured in weight percent) on the x-axis. Gasoline includes all $C_5$-221° C. gases, that is every hydrocarbon with more than 5 carbon atoms which boils below 221° C. Each data point shows, on the y-axis, the conversion of a feedstock oil to gasoline gas upon exposure to each catalyst USY, USY-S, HTS-Meso, HTS-Meso-S, Meso, and Meso-S. Each data point shows, on the x-axis, the total conversion (the sum of dry gas, LPG, gasoline, LCO, HCO, and coke converted from the feedstock oil measured in weight percent) produced by the conversion of a feedstock oil upon exposure to each catalyst USY, USY-S, HTS-Meso, HTS-Meso-S, Meso, and Meso-S.

TABLE 5

Selectivity for Gasoline ($C_5$-221° C.)
Measured in Weight %

| | Material | Steamed Material | Material-Steamed Material |
|---|---|---|---|
| USY | 18.58 | 6.02 | 12.56 |
| HTS-Meso | 35.90 | 17.40 | 18.50 |
| Meso | 39.24 | 12.80 | 26.44 |

Table 5 compares the selectivity for the production of gasoline $C_5$-221° C. gases from a feedstock oil by each catalyst when the catalyst is unused or fresh, i.e., USY, HTS-Meso, and Meso and after steaming, i.e., USY-S, HTS-Meso-S, and Meso-S. The difference between hydrothermally stable mesostructure selectivity for gasoline when it is unused or fresh prior to exposure to steam (i.e., HTS-Meso is 35.90 weight percent) and hydrothermally stable mesostructure selectivity for gasoline after exposure to steam (i.e., HTS-Meso-S is 17.40 weight percent) is 18.50 weight percent. The difference between the inorganic material having long-range crystallinity selectivity for gasoline when it is unused or fresh prior to exposure to steam (i.e., USY is 18.58 weight percent) and hydrothermally stable mesostructure selectivity for gasoline after exposure to steam (i.e., USY-S is 6.02 weight percent) is 12.56 weight percent. Thus, the difference between the non-hydrothermally stable mesostructure selectivity prior to and after exposure to steam, i.e., 18.50, weight percent is substantially the same as the difference between inorganic material selectivity prior to and after exposure to steam, i.e., 12.56 weight percent. As a result of exposure to steam, the reduction in selectivity of the mesostructure for, for example, gasoline from a feedstock oil is about 47% greater than the reduction in selectivity of the inorganic material for gasoline from a feedstock oil. As such, as a result of exposure to steam, the selectivity for gasoline from feedstock oil of the inorganic material USY and the hydrothermally stable mesostructure HTS-Meso were reduced by substantially the same amount. In this way, it can be seen that the mesostructure HTS-Meso has substantially the same hydrothermal stability as the inorganic material USY. Also, after exposure to the steaming conditions the hydrothermally stable mesostructure HTS-Meso-S has a selectivity for gasoline measuring 17.40 weight percent, which is substantially the same (about 6% less) than the selectivity of the fresh or unused inorganic material USY.

Referring still to Table 5, the non-hydrothermally stable mesostructure, Meso, loses a great deal more selectivity than the inorganic material USY. Specifically, the difference between the non-hydrothermally stable mesostructure selectivity for gasoline when it is unused or fresh prior to exposure to steam (i.e., Meso is 39.24 weight percent) and non-hydrothermally stable mesostructure selectivity for gasoline after exposure to steam (i.e., Meso-S is 12.80 weight percent) is 26.44 weight percent. The difference between the inorganic material having long-range crystallinity selectivity for gasoline when it is unused or fresh prior to exposure to steam (i.e., USY is 18.58 weight percent) and hydrothermally stable mesostructure selectivity for gasoline after exposure to steam (i.e., USY-S is 6.02 weight percent) is 12.56 weight percent. Thus, the difference between the hydrothermally stable mesostructure selectivity prior to and after exposure to steam, i.e., 26.44 weight percent is 211% greater than the reduction in selectivity of the inorganic material prior to and after exposure to steam (i.e., 12.56 weight percent) for gasoline from a feedstock oil. As such, as a result of exposure to steam, the selectivity of the non-hydrothermally stable mesostructure is different from and worse than the selectivity of the inorganic material.

Figure 8:
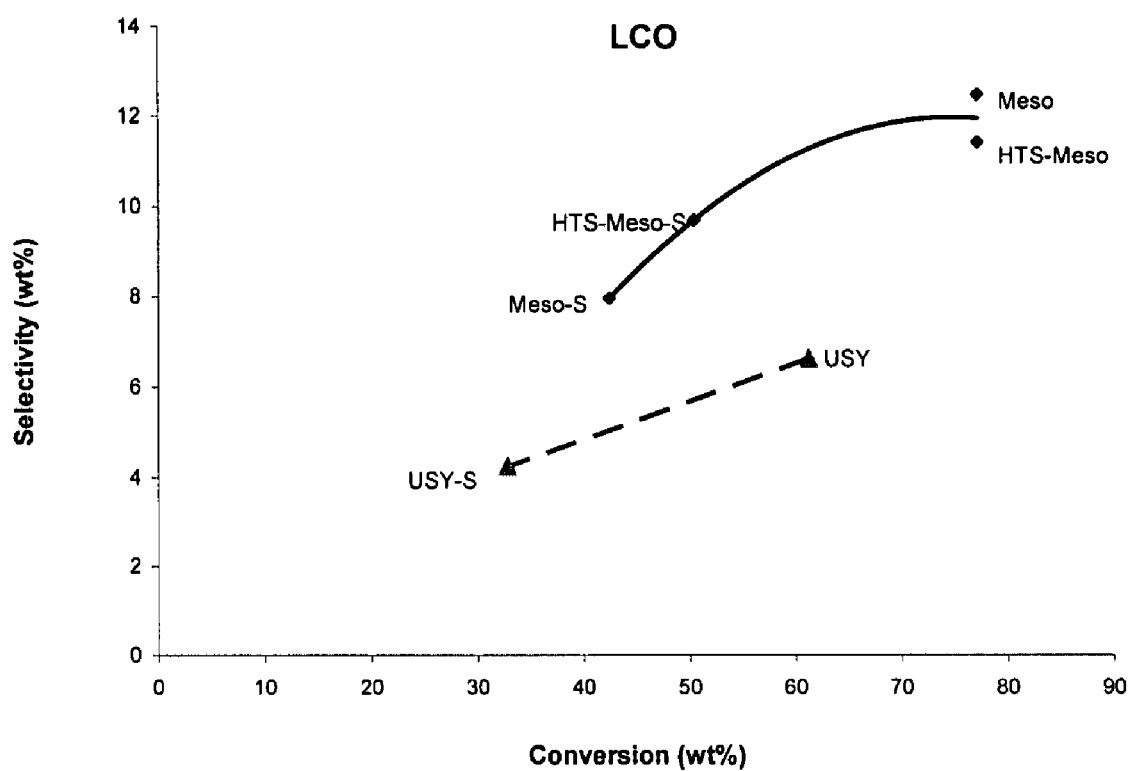
FIG. 8 depicts on the x-axis the total conversion (conversion of feedstock oil to the sum of the dry gas, LPG, gasoline, LCO, HCO, and coke produced by the reaction and measured in weight percent) and on the y-axis the selectivity for the LCO, i.e., diesel, fraction in weight percent.
Figure 11:
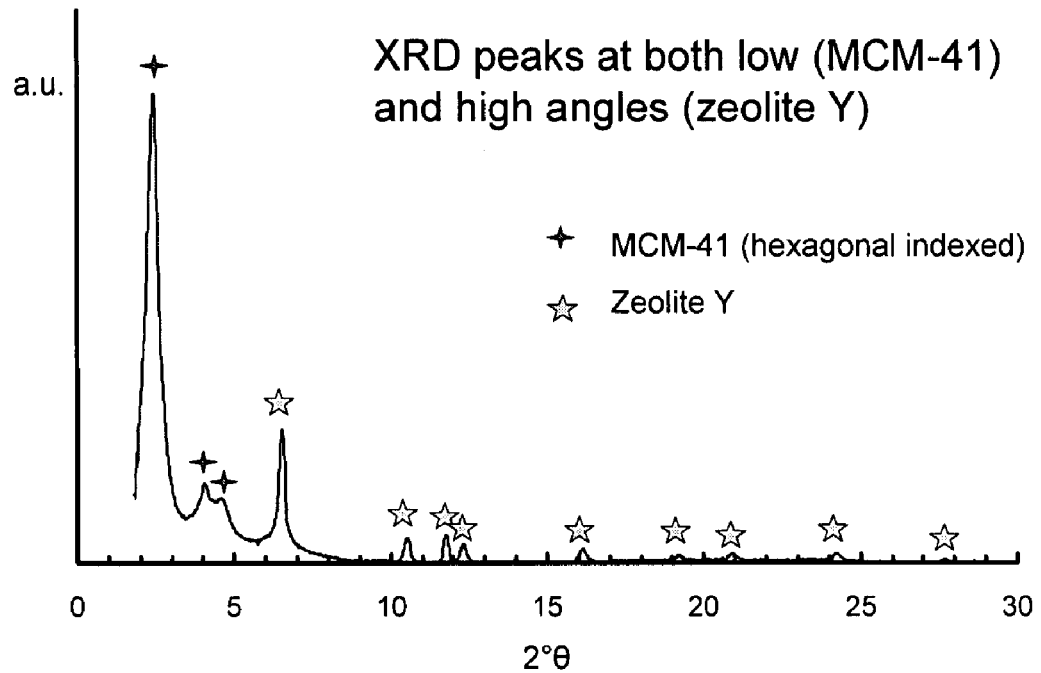
FIG. 11 depicts the X-ray diffraction pattern of the zeolite Y having long-range crystallinity and the mesostructured zeolite H-Y[MCM-41] having long-range crystallinity. The ordered mesostructure having long-range crystallinity H-Y [MCM-41] (revealed by the XRD peaks at low angles) and the unmodified zeolite Y having long-range crystallinity structure Y are present.

FIG. 8 depicts the selectivity for weight percent of LCO on the y-axis and the total conversion (the sum of dry gas, LPG, gasoline, LCO, HCO, and coke converted from the feedstock oil measured in weight percent) on the x-axis. LCO includes all 221° C.-343° C. gases, that is every hydrocarbon that boils above 221° C. and below 343° C. Each data point shows, on the y-axis, the conversion of a feedstock oil to LCO gas upon exposure to each catalyst USY, USY-S, HTS-Meso, HTS-Meso-S, Meso, and Meso-S. Each data point shows, on the x-axis, the total conversion (the sum of dry gas, LPG, gasoline, LCO, HCO, and coke converted from the feedstock oil measured in weight percent) produced by the conversion of a feedstock oil upon exposure to each catalyst USY, USY-S, HTS-Meso, HTS-Meso-S, Meso, and Meso-S. FIG. 11 shows that the regenerated hydrothermally stable mesostructure HTS-Meso-S produces the largest amount of LCO relative to the other regenerated catalysts USY-S and Meso-S.

TABLE 6

Selectivity for Light Cycle Oil (LCO) i.e., diesel Measured in Weight %

|  | Material | Steamed Material | Material- Steamed Material |
| --- | --- | --- | --- |
| USY | 6.63 | 4.24 | 2.39 |
| HTS-Meso | 11.43 | 9.70 | 1.73 |
| Meso | 12.49 | 7.96 | 4.53 |

Table 6 compares the selectivity for the production of LCO's from a feedstock oil by each catalyst when the catalyst is unused or fresh, i.e., USY, HTS-Meso, and Meso and after steaming, i.e., USY-S, HTS-Meso-S, and Meso-S. The difference between hydrothermally stable mesostructure selectivity for LCO's when it is unused or fresh prior to exposure to steam (i.e., HTS-Meso is 11.43 weight percent) and hydrothermally stable mesostructure selectivity for LCO's after exposure to steam (i.e., HTS-Meso-S is 9.70 weight percent) is 1.73 weight percent. The difference between the inorganic material having long-range crystallinity selectivity for LCO's when it is unused or fresh prior to exposure to steam (i.e., USY is 6.63 weight percent) and hydrothermally stable mesostructure selectivity for LCO's after exposure to steam (i.e., USY-S is 4.24 weight percent) is 2.39 weight percent. Thus, the difference between the hydrothermally stable mesostructure selectivity prior to and after exposure to steam, i.e., 1.73 weight percent is substantially the same as the difference between inorganic material selectivity prior to and after exposure to steam, i.e., 2.39 weight percent. As a result of exposure to steam, the reduction in selectivity of the hydrothermally stable mesostructure for, for example, LCO's from a feedstock oil is about 28% less than the reduction in selectivity of the inorganic material for LCO's from a feedstock oil. As such, as a result of exposure to steam, the selectivity for LCO's from feedstock oil of the inorganic material USY and the hydrothermally stable mesostructure HTS-Meso were reduced by substantially the same amount. In this way, the mesostructure HTS-Meso has substantially the same hydrothermal stability as the inorganic material USY. Also, after exposure to the steaming conditions the hydrothermally stable mesostructure HTS-Meso-S has a selectivity for LCO's measuring 9.70 weight percent, which is greater than the selectivity of the fresh or unused inorganic material USY for LCO's.

Referring still to Table 6, the non-hydrothermally stable mesostructure, Meso, loses a great deal more selectivity than the inorganic material USY. Specifically, the difference between the non-hydrothermally stable mesostructure selectivity for LCO's when it is unused or fresh prior to exposure to steam (i.e., Meso is 12.49 weight percent) and non-hydrothermally stable mesostructure selectivity for LCO's after exposure to steam (i.e., Meso-S is 7.96 weight percent) is 4.53 weight percent. The difference between the inorganic material having long-range crystallinity selectivity for LCO's when it is unused or fresh prior to exposure to steam (i.e., USY is 6.63 weight percent) and hydrothermally stable mesostructure selectivity for gasoline after exposure to steam (i.e., USY-S is 4.24 weight percent) is 2.39 weight percent. Thus, the difference between the hydrothermally stable mesostructure selectivity prior to and after exposure to steam, i.e., 4.53 weight percent is about 90% greater than the reduction in selectivity prior to and after exposure to steam of the inorganic material for LCO's from a feedstock oil. As such, as a result of exposure to steam, the selectivity of the non-hydrothermally stable mesostructure is different from and worse than the selectivity of the inorganic material.

Figure 9:
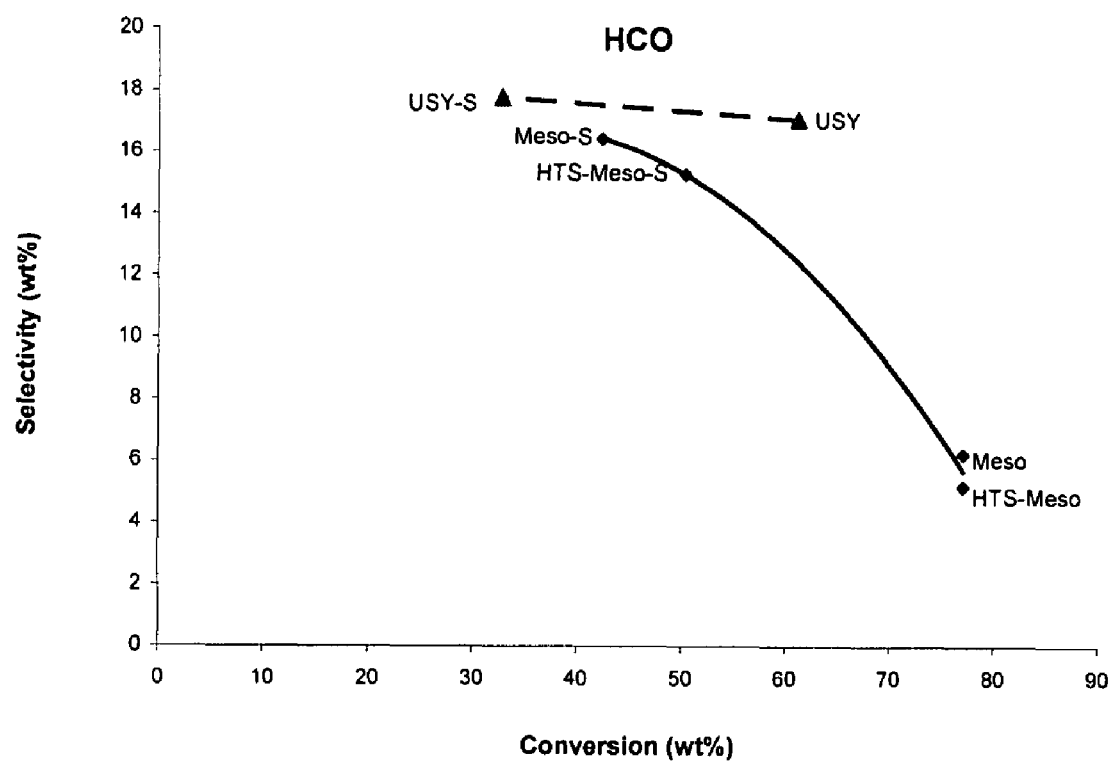
FIG. 9 depicts on the x-axis the total conversion (conversion of feedstock oil to the sum of the dry gas, LPG, gasoline, LCO, HCO, and coke produced by the reaction and measured in weight percent) and on the y-axis the selectivity for the HCO fraction in weight percent.

FIG. 9 depicts the selectivity for weight percent of HCO on the y-axis and the total conversion (the sum of dry gas, LPG, gasoline, LCO, HCO, and coke converted from the feedstock oil measured in weight percent) on the x-axis. HCO includes heavies, 343° C. and higher gases, that includes hydrocarbons that boil at 343° C. and higher. Each data point shows, on the y-axis, the conversion of a feedstock oil to HCO gas upon exposure to each catalyst USY, USY-S, HTS-Meso, HTS-Meso-S, Meso, and Meso-S. Each data point shows, on the x-axis, the total conversion (the sum of dry gas, LPG, gasoline, LCO, HCO, and coke converted from the feedstock oil measured in weight percent) produced by the conversion of a feedstock oil upon exposure to each catalyst USY, USY-S, HTS-Meso, HTS-Meso-S, Meso, and Meso-S.

TABLE 7

Selectivity for Heavy Cycle Oil (HCO) i.e., heavies Measured in Weight %

|  | Material | Steamed Material | Material- Steamed Material |
| --- | --- | --- | --- |
| USY | 17.11 | 17.79 | −0.68 |
| HTS-Meso | 6.23 | 15.30 | −9.07 |
| Meso | 5.19 | 16.46 | −11.27 |

FIG. 9 and Table 7 show that the selectivity for production of HCO's increases when each of the catalysts is exposed to steaming. FIG. 9 shows that the selectivity for HCO decreases as the total conversion increases. With each of the catalysts, when the total conversion is relatively high the selectivity for HCO's is relatively low and when the total conversion is relatively low the selectivity of HCO's is relatively high. The HCO fraction is the only fraction in Example 3 that shows a decrease in selectivity with an increase in conversion, which is due to fewer HCO's being present as part of the total conversion as more of the desired products (i.e., gasoline and LCO's for example) are produced by exposure to the catalyst. The inorganic material USY experiences the slightest increase in the production of HCO's due to the introduction of steaming to the catalyst. The difference between the weight percent of HCO's produced by the fresh or unused mesostructures HTS-Meso, and Meso as compared to the unused inorganic material USY show that the two mesostructured catalysts HTS-Meso, and Meso have lower selectivity for HCO's than the inorganic material. Specifically, each of HTS-Meso, and Meso has less than half the selectivity for HCO's than the inorganic material USY. Both mesostructures HTS-Meso and Meso produce less HCO's, because the mesostructures make better use of the HCO's to produce more desirable product fractions including, for example, gasoline and diesel (i.e., LCO).

Figure 10:
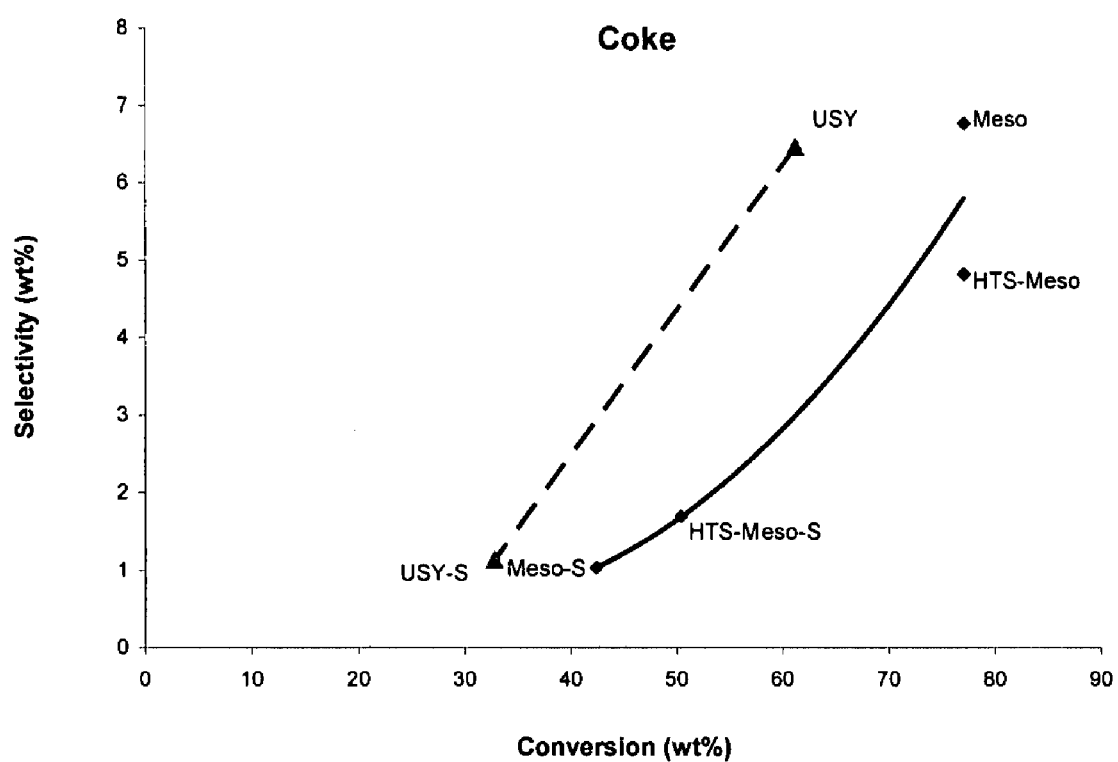
FIG. 10 depicts on the x-axis the total conversion (conversion of feedstock oil to the sum of the dry gas, LPG, gasoline, LCO, HCO, and coke produced by the reaction and measured in weight percent) and on the y-axis the selectivity for the coke fraction in weight percent.

FIG. 10 depicts the selectivity for weight percent of coke on the y-axis and the total conversion (the sum of dry gas, LPG, gasoline, LCO, HCO, and coke converted from the feedstock oil measured in weight percent) on the x-axis. The data points show, on the y-axis, the conversion of a feedstock oil to coke upon exposure to each catalyst USY, USY-S, HTS-Meso, HTS-Meso-S, Meso, and Meso-S. The data points show, on the x-axis, the total conversion (the sum of dry gas, LPG, gasoline, LCO, HCO, and coke converted from the feedstock oil measured in weight percent) produced by the conversion of a feedstock oil upon exposure to each catalyst USY, USY-S, HTS-Meso, HTS-Meso-S, Meso, and Meso-S. Regeneration or steaming of each catalyst reduces the catalyst selectivity for coke. In addition, because there is a reduction in total conversion after a catalyst is steamed compared to an unused catalyst, there selectivity for coke is expected to decrease due to the chemistry limitations of the conversion of feedstock oil to the various fractions.

The method of making a mesostructure having long-range crystallinity from a zeolite having long-range crystallinity by exposure to the concentrated conditions of a thick slurry is based on the short-range reorganization of a zeolite structure in the presence of a surfactant to accommodate mesoporosity without loss of zeolitic long-range crystallinity. Without being bound to any one theory, it is believed that exposure to the pH controlling substance softens a surface of a conventional zeolite having long-range crystallinity. The softened zeolite surface enables the surfactant to penetrate the zeolite to define or create mesopores in the zeolite, which forms the mesostructured zeolite, which is a mesostructure having long-range crystallinity. More specifically, the pH conditions that are employed enable the surfactant to penetrate the structure of the zeolite. However, the pH conditions do not dissolve the zeolite. As the surfactant penetrates the zeolite, forming a plurality of mesopores, the penetrated portion is exposed to the controlled pH mixture (i.e., the pH controlling substance dissolved in the sufficient quantity of solution) and is softened, enabling further penetration by the surfactant. The penetration continues in this fashion throughout the volume of the zeolite. The penetration through the zeolite volume may be in any single direction or in a combination of directions, for example, the penetration may be through the x direction, the y direction, the z direction, or any combination thereof. The penetration direction or rate is not necessarily linear. Penetration may be ordered or, optionally, the penetration and consequently the mesopores may be disordered or random. Optionally, one or more of the mesopores intersect, interconnect, converge, and/or align, which impacts the arrangement of the resulting mesopores defined within the zeolite that form the mesostructure. The mesostructure retains the long-range crystallinity of the zeolite. The surfactant enables penetration into the zeolite having long-range crystallinity, creating mesopores. The type of surfactant determines, at least in part, the size of the mesopore including, for example, the size of the mesopore diameter and/or the size of the mesopore cross section. Penetration into the conventional fully crystalline zeolite is not observed where a controlled pH solution, for example, a base having a pH of 10, held at controlled time and temperature conditions is mixed with a zeolite without a surfactant The structure of the mesostructures having long-range crystallinity that can be made by exposure to the concentrated conditions of the thick slurry was studied via various techniques including x-ray diffraction (XRD), infrared spectroscopy (FTIR), adsorption isotherms, and transmission electronic microscopy (TEM).

FIG. 11 shows the XRD patterns of a mesostructure H-Y [MCM-41]. As used herein, the naming convention for mesostructured zeolites, e.g., H-Y[MCM-41] first includes the starting inorganic material, here a zeolite, structure, e.g., H-Y and then, placed adjacent, in brackets, is the name of the mesostructure, e.g., [MCM-41]. The mesostructured zeolite H-Y[MCM-41] retains the long-range crystallinity, also called full crystallinity, of the zeolite H-Y, and features the hexagonal pore structure of [MCM-41]. The mesostructure is formed from a plurality of mesopores in a hexagonal pattern [MCM-41] that are defined in the zeolite H-Y. The mesostructure H-Y[MCM-41] has long-range crystallinity.

FIG. 11 depicts the X-ray diffraction pattern of a mesostructure having long-range crystallinity, the mesostructured zeolite H-Y[MCM-41]. Both the order MCM-41 (revealed by the XRD peaks at low angles) and the zeolitic structure H-Y having long-range crystallinity are present in the mesostructure. Referring still to FIG. 11, intense peaks, both at low and high 2°θ values reveal both the ordered mesostructure and the zeolitic crystallinity of this family of materials. The peaks at low 2°θ values can be indexed to hexagonal symmetry indicating the presence of MCM-41, whereas the well-defined XRD peaks at high 2°θ values correspond, respectively, to the zeolite, e.g., zeolite Y. This X-ray diffraction pattern shows that that mesostructure retains long-range crystallinity.

Figure 12:
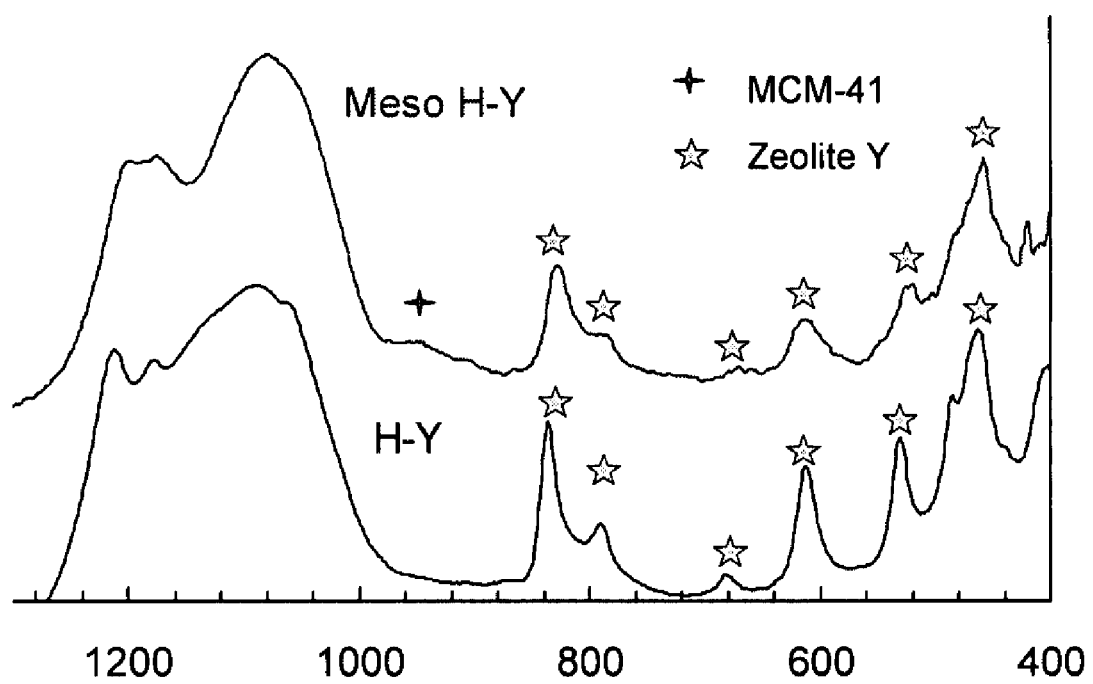
FIG. 12 depicts FTIR characterization peaks for the mesostructured zeolite H-Y[MCM-41] having long-range crystallinity, labeled Meso-H-Y, and the unmodified zeolite Y, labeled H-Y.
Figure 13:
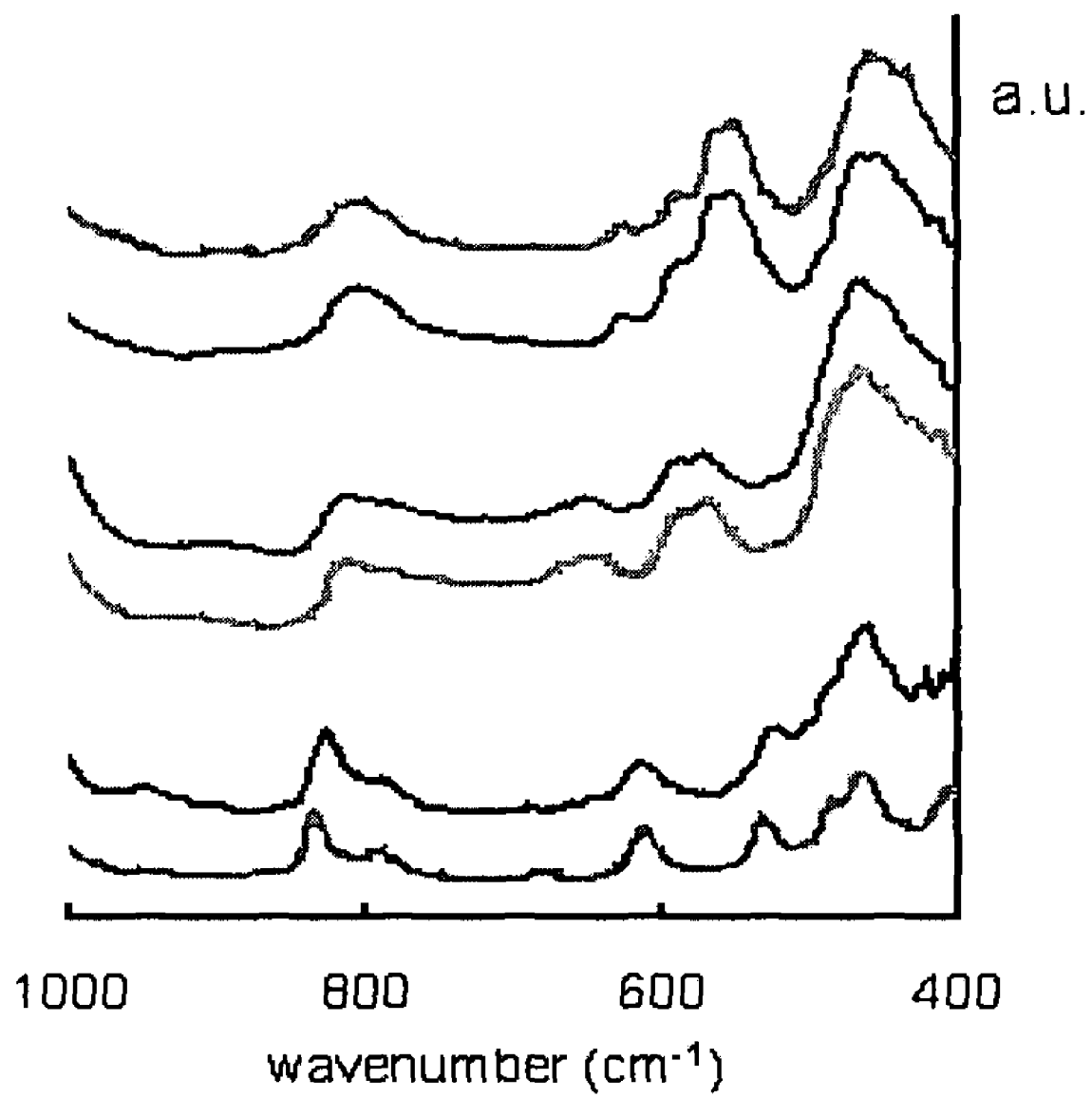
FIG. 13 depicts FTIR spectra of mesostructured zeolites having long-range crystallinity H-Y[MCM-41] (upper top), H-MOR[MCM-41] (upper middle), H-ZSM-5[MCM-41] (upper bottom) and FTIR spectra of their unmodified zeolites having long-range crystallinity H-Y (lower top), H-MOR (lower middle), H-ZSM-5 (lower bottom). A match between each mesostructure having long-range crystallinity and its corresponding unmodified zeolite having long-range crystallinity is observed, indicating the fully zeolitic connectivity present in the mesostructures having long-range crystallinity.

The connectivity of mesostructures having long-range crystallinity was studied by infrared spectroscopy (FTIR) (See FIGS. 12-13). FIG. 12 depicts FTIR characterization peaks for the mesostructure having long-range crystallinity, H-Y[MCM-41] labeled Meso-H—Y, and zeolite Y having long-range crystallinity labeled H-Y. Referring still to FIG. 12, the FTIR spectra of the mesostructure H-Y[MCM-41], labeled Meso-H-Y, is on the top and the FTIR spectra of the unmodified conventional long-range crystalline zeolite H-Y is on the bottom. Still referring to FIG. 12, the FTIR characterization peaks reveal that the connectivity found in the unmodified zeolite Y, labeled H-Y, remains present when the unmodified zeolite is transformed into the mesostructure, labeled Meso-H-Y.

FIG. 13 depicts FTIR spectra of mesostructures having long-range crystallinity, H-Y[MCM-41] (upper top), H-MOR[MCM-41] (upper middle), H-ZSM-5[MCM-41] (upper bottom), and FTIR spectra of their zeolitic versions having long-range crystallinity in conventional, unmodified form, H-Y (lower top), H-MOR (lower middle), H-ZSM-5 (lower bottom). The spectra of the mesostructured zeolite H-Y[MCM-41] is the upper top spectra (lighter line) and the spectra of the unmodified zeolite H-Y is the lower top spectra (darker line). The spectra of the mesostructured zeolite H-MOR[MCM-41] is the upper middle spectra (darker line) and the spectra of the unmodified zeolite H-MOR is the lower middle spectra (lighter line). The spectra of the mesostructured zeolite H-ZSM-5[MCM-41] is the upper bottom spectra (darker line) and the spectra of the unmodified zeolite H-ZSM-5 is the lower bottom spectra (lighter line). In FIG. 13 a match between each long-range crystalline mesostructure and its corresponding unmodified long-range crystalline zeolite is observed, indicating the zeolitic connectivity present in the unmodified long-rang crystalline zeolite remains present in long-range crystalline mesostructures. FIG. 13 shows a remarkable match between the IR spectra of the mesostructured zeolites H-Y[MCM-41], H-MOR[MCM-41], and H-ZSM-5[MCM-41] and the IR spectra of the their corresponding unmodified zeolitic versions, H-Y, H-MOR, H-ZSM-5.

Figure 14:
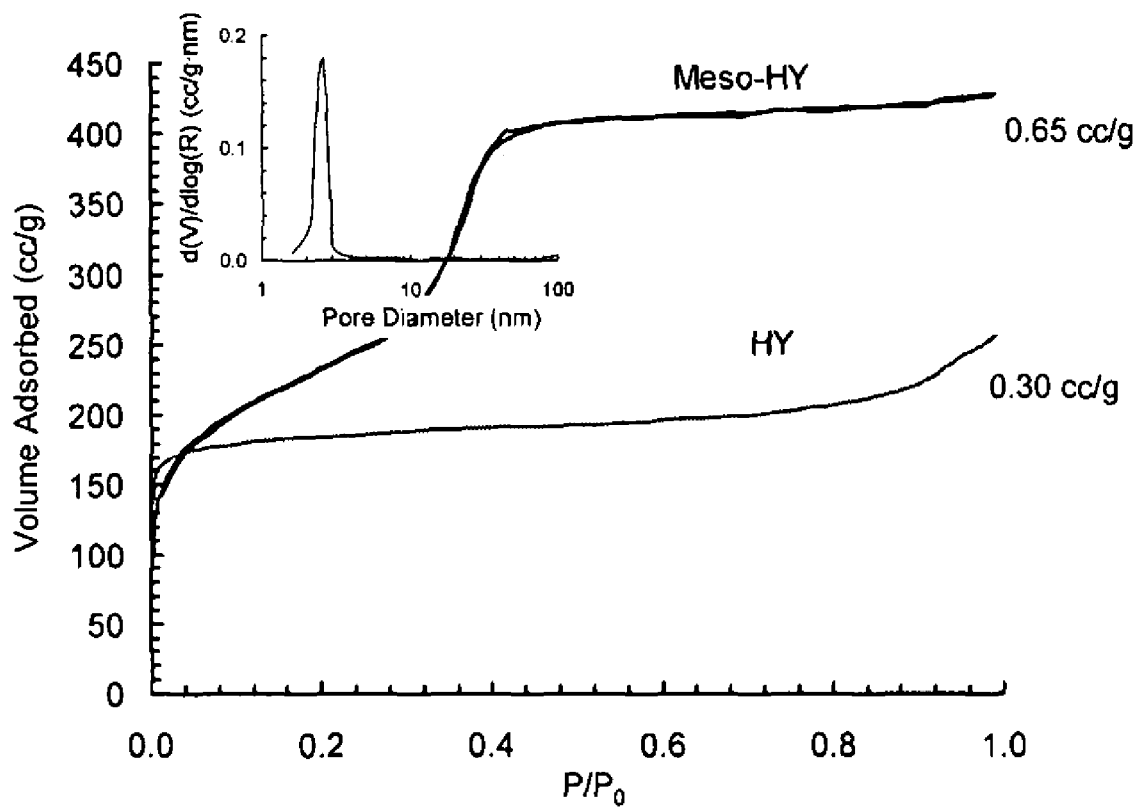
FIG. 14 depicts the Nitrogen adsorption isotherm at 77 K of the mesostructured zeolite having long-range crystallinity H-Y[MCM-41], labeled Meso-H-Y, and the unmodified zeolite having-long range crystallinity, H-Y. The pore size distribution (BJH method) of the mesostructure having long-range crystallinity labeled Meso-H-Y is included in inset. The presence of well developed narrow pore size mesoporosity in the mesostructure is evident by the sharp uptake at $P/P_0 \sim 0.3$.

The presence of well-defined mesoporosity in mesostructured zeolites can be suitably studied by nitrogen adsorption at 77 K. FIG. 14 shows the nitrogen adsorption isotherm at 77 K of the long-range crystalline mesostructured zeolite, H-Y [MCM-41], labeled Meso-HY, and its unmodified zeolitic version, H-Y. The presence of well developed narrow pore size diameter distribution mesoporosity is evident in the mesostructured sample. The pore size of the mesoporosity is controlled such that a diameter and or a cross sectional area of each of the mesopores in a specific long-range crystalline mesostructure fall within a narrow pore size diameter distribution. In one embodiment, the diameter has a value within the range of from about 2 nm to about 60 nm, or from about 10 nm to about 30 nm, for example. In accordance with the long-range crystalline mesostructures, in one embodiment, more than 95% of the mesopores have a pore size (e.g., a diameter and/or a cross sectional area) that falls within plus or minus 10% of the average pore size. In another embodiment, more than 95% of the mesopores have a pore size (e.g., a diameter and/or a cross sectional area) that falls within plus or minus 30% of the average pore size. In still another embodiment, more than 95% of the mesopores have a pore size (e.g., a diameter and/or a cross sectional area) that falls within plus or minus 75% of the average pore size. Each pore wall or mesopore surface that surrounds a diameter controlled mesopore is substantially similar in size. The long-range crystalline mesostructure has controlled mesoporosity pore size cross sectional area. Where the mesopores are substantially cylindrical in shape in addition to having a pore size cross sectional area these pores have a pore size diameter. However, where the shape of the mesopores are not cylinder like and are, for example, slit shaped, worm-like, e.g., with a changing diameter throughout at least a portion of the depth of the mesopore surface that surrounds an exemplary mesopore, or non defined shapes then at least a portion of such a mesopore surface has a controlled mesopore cross sectional area. The size of the mesopores is controlled by, for example, the selected surfactant and/or quantity of surfactant used when making a long-range crystalline mesostructure from a conventional unmodified zeolite having long-range crystallinity. Prior attempts to incorporate mesostructures into zeolites have been unable to achieve such a controlled mesoporosity that result in substantially all mesopores in a zeolite having a substantially similar size (e.g., diameter and/or cross sectional area) and a controlled pore arrangement (e.g., [MCM-41] having a hexagonal pore arrangement). Rather, prior attempts to form mesostructures in zeolites result in any or a combination of a broader pore size distribution ranging from small, medium, to large size pores, different shaped pores, and uncontrolled arrangements.

A significant volume of mesoporosity can be introduced into the sample. For example, referring to FIG. 14, in one embodiment the mesopore volume is roughly doubled when the zeolite is mesostructured. In this example, the unmodified long-range crystalline zeolite H-Y had total pore volume (mainly microporous pore volume) of 0.30 cc/g whereas the long-range crystalline mesostructured zeolite labeled Meso-HY, which is HY[MCM-41], has a total pore volume of 0.65 cc/g. Conventional zeolites such as HY adsorb nitrogen only at low pressures, producing type I isotherms that are characteristic of microporous materials. However, the mesostructures show sharp nitrogen uptakes at higher partial pressures ($P/P_0 \sim 0.3$-0.4), which is a characteristic feature of mesostructured materials with narrow pore-size distribution (pore diameter~2.5 nm).

Figure 15:
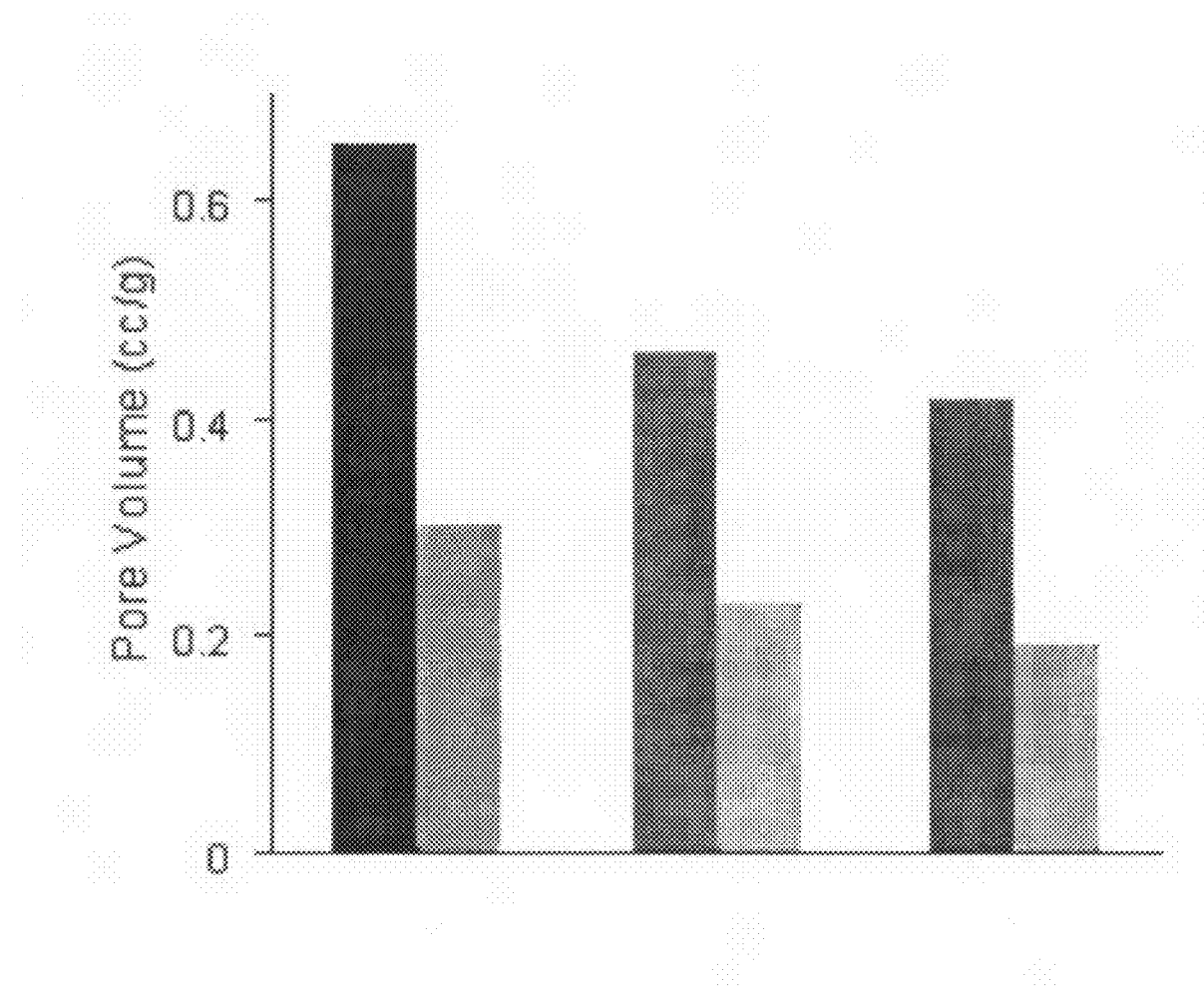
FIG. 15 depicts pore volumes (darker columns) of mesostructures having long-range crystallinity H-Y[MCM-41] (left), H-MOR[MCM-41] (center), and H-ZSM-5[MCM-41] (right) and the unmodified zeolites having long-range crystallinity prior to transformation to provide mesostructures (lighter columns) of H-Y (left), H-MOR (center), and H-ZSM-5 (right).

FIG. 15 depicts mesostructured zeolite pore volumes (darker columns) of H—Y[MCM-41] (left), H-MOR[MCM-41] (center), and H-ZSM-5[MCM-41] (right) and their zeolitic versions (lighter columns) of H-Y (left), H-MOR (center), and H-ZSM-5 (right). Compared to conventional zeolites, the long-range crystalline mesostructured zeolites of the invention have more than double the pore volume (see FIG. 15) due to the incorporation of a well-developed, narrow distribution of pore-size diameter mesoporosity. Referring still to FIG. 15, the volume of mesoporosity that is incorporated can be controlled. The long-range crystalline mesostructured zeolite mesoporosity volume is controlled by, for example, the quantity of surfactant added as a percentage of the quantity of zeolite. Other factors that contribute to mesoporosity volume include the pH, time, and temperature conditions employed. In one embodiment, the quantity of the pH controlling substance and the quantity of solution sufficient to dissolve the pH controlling substance that is added is an amount suitable to achieve the desired surfactant concentration in view of the amount of zeolite. The pore volume is expressed in cc/g, the cubic centimeters of pores over the grams of the zeolite. The mesostructure having long-range crystallinity has a pore volume that is a value within the range of from about 0.05 cc/g to about 2 cc/g, or from about 0.5 cc/g to about 1 cc/g. The mesopore size is controlled and the mesopore volume is controlled by the type and the quantity of surfactant used to create the zeolite mesostructure from the zeolite. The time and temperature conditions also contribute to the mesopore size and/or the mesopore volume.

The mesostructured zeolites have sharper uptake at low partial pressures, which indicates the presence of mesoporosity, and slightly higher pore size. The size of the mesopore can be easily tuned or controlled by changing the length of the aliphatic chain of the surfactant. Optionally, the mesopore pore size diameter can also be controlled by, for example, the choice of surfactant and/or the quantity of the surfactant.

In one aspect of the invention, a mesostructure having long-range crystallinity is produced, as described above, by exposing a conventional zeolite to the concentrated conditions of a thick slurry under time and temperature conditions sufficient to obtain the desired mesopore size and mesopore volume. The long-range crystalline mesostructure retains substantially the same exterior surface contour (e.g., has substantially the same external size and external shape) and covers substantially the same perimeter as the unmodified conventional long-range crystalline zeolite used to make the mesostructure having long-range crystallinity. A suitable unmodified conventional zeolite may range in size from about 400 nm to about 5 microns. The conditions employed to form the mesopores do not substantially change the external size, external shape or the perimeter of the unmodified zeolite. The density of the mesostructured zeolite is less than the density of the unmodified zeolite, however, the decrease in density is due to the incorporation of mesoporosity in the zeolite. In addition, where the long-range crystalline mesostructure is produced from a conventional unmodified long-range crystalline zeolite, the long-range crystalline mesostructure maintains the long-range or full crystallinity of the unmodified conventional zeolite.

Where the unmodified conventional zeolite starting material has a chemical composition in its framework, after mesopores are formed in the conventional zeolite, the chemical composition in the resulting mesostructured zeolite framework will remain substantially the same as the chemical composition in the unmodified conventional zeolite framework that was used as source material. The chemical composition of the unmodified conventional zeolite can vary from the external surface (e.g., about the zeolite perimeter) to the inner core. However, the chemical composition of unmodified conventional zeolite framework, whether consistent or variable from the perimeter to the inner core of the zeolite, is unchanged when the mesopores are formed in the zeolite. Thus, forming mesopores to create the mesostructure having long-range crystallinity does not chemically alter the framework of the conventional zeolite. The zeolite stoichiometry is unchanged from the unmodified conventional long-range crystalline zeolite to the mesostructure having long-range crystallinity. The methods of making mesostructures does not change the chemical composition of the framework compared to the unmodified conventional zeolite. For example, in zeolites containing Si and Al, in a mesostructured zeolite the alumina within the mesostructure framework remains tetra-coordinated. The mesostructure having long-range crystallinity has a tetracoordinated aluminium/octacoordinated aluminium ratio that is substantially the same as the tetracoordinated aluminium/octacoordinated aluminium ratio of the unmodified conventional zeolite.

Figure 16:
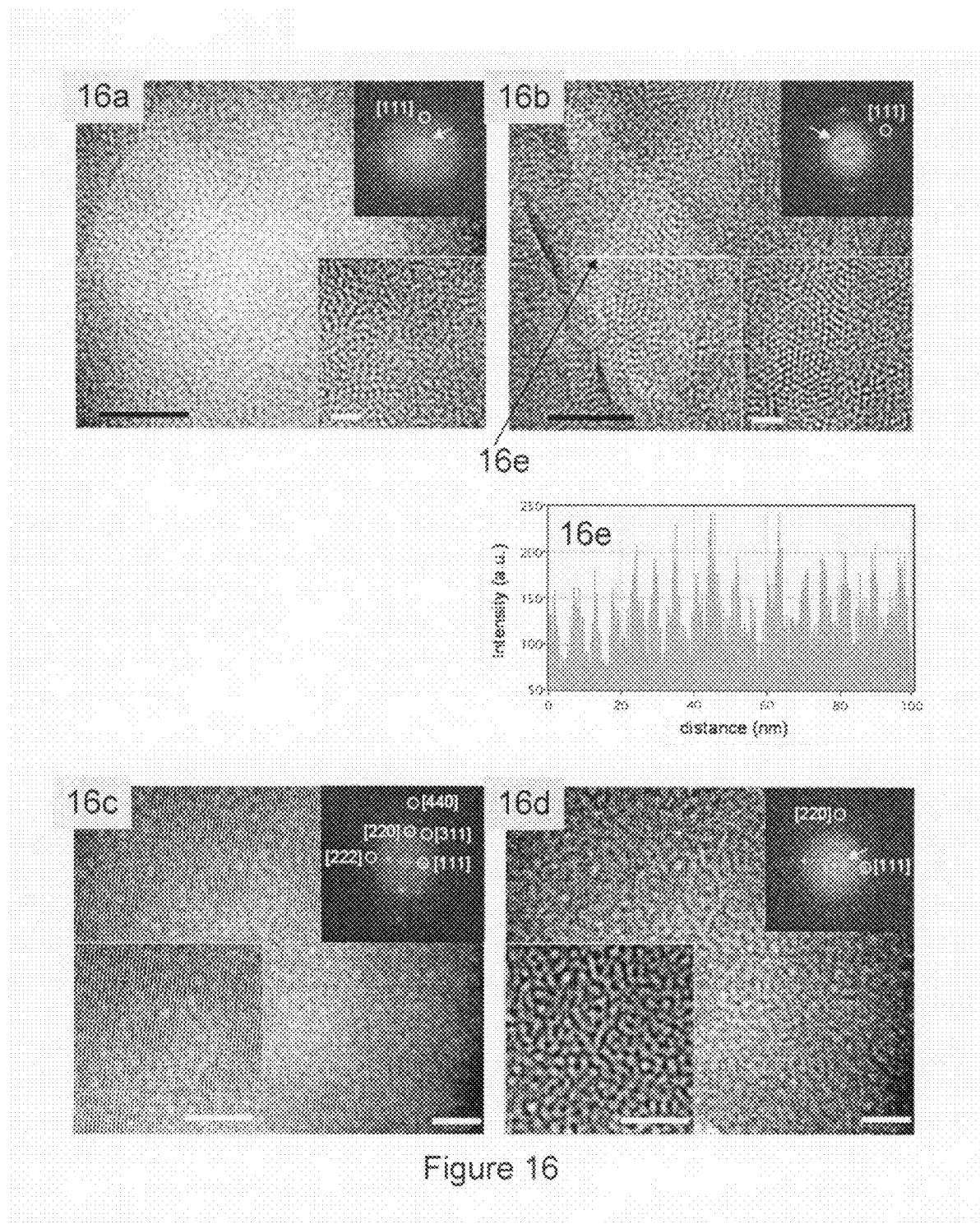
FIG. 16 depicts images obtained by transmission electron microscopy (TEM) of a) a low magnification TEM micrograph of a first mesostructured zeolite USY having long-range crystallinity, b) a low magnification TEM micrograph of a second mesostructured zeolite USY having long-range crystallinity, c) a low magnification TEM micrograph of a third mesostructured zeolite USY having long-range crystallinity at a focus to show the zeolite crystal lattice present in the mesostructure, d) a low magnification TEM micrograph of a fourth mesostructured zeolite USY having long-range crystallinity at a focus to show the mesoporosity of the mesostructure, and e) is a cross sectional scattering intensity distribution of the portion of the mesostructured zeolite USY having long-range crystallinity indicated in FIG. 16b. Fast Fourier Transforms (FFT) and high magnification micrographs showing the electron diffraction patterns of FIGS. 11a-11d are included as insets in FIGS. 16a-16d.

The nature of mesostructured zeolites is evidenced via transmission electronic microscopy (TEM). FIGS. 16a-16d show details of a mesostructured zeolite at different foci in which both the long-range crystallinity and ordered mesoporosity can be observed in a single phase. FIGS. 16a-16d depict images obtained by transmission electron microscopy (TEM). FIG. 16a is a low magnification TEM micrograph of a first mesostructured zeolite USY having long-range crystallinity and FIG. 16b is a low magnification TEM micrograph of a second mesostructured zeolite USY having long-range crystallinity. FIG. 16c shows a low magnification TEM micrograph of a third mesostructured zeolite USY having long-range crystallinity at a focus to show the zeolite crystal lattice present in the mesostructure. FIG. 16d shows a low magnification TEM micrograph of a fourth mesostructured zeolite USY having long-range crystallinity at a focus to show the mesoporosity of the mesostructure. FIG. 16e is a cross sectional scattering intensity distribution of the portion of the mesostructured zeolite USY having long-range crystallinity indicated in FIG. 16b. Fast Fourier Transforms (FFT) and high magnification micrographs showing the electron diffraction patterns of FIGS. 11a-11d are included as insets in FIGS. 16a-16d. Each FFT inset in FIGS. 16a-16d show that the mesostructure has long-range crystallinity. Each drawn circle within each FFT inset in FIGS. 16a-16d shows that the pores have the same size. Each arrow (inset in FIGS. 16a, 16b, and 16d) shows that the mesostructure has long-range crystallinity.

The presence of mesopores, high surface area, and the thickness of the pore wall or the interior wall between adjacent mesopores is a value within the range of from about 1 nm to about 50 nm, for example, 2 nm. The pore wall thickness makes the mesostructures having long-range crystallinity suitable for catalysis. These characteristics appear to allow access to bulkier molecules and reduce intracrystalline diffusion resistance in the long-range crystalline mesostructured zeolites as compared to conventional unmodified long-range crystalline zeolites. Enhanced catalytic activity for bulky molecules is observed in mesostructured zeolites compared to conventional zeolites.

More than 135 different zeolitic structures have been reported to date, but only about a dozen of them have commercial applications, mostly the zeolites with 3-D pore (i.e., three dimensional) structures. The incorporation of 3-D mesopores would be especially beneficial for zeolites with 1-D and 2-D pore structures as it would greatly facilitate intracrystalline diffusion. Zeolites with 1-D and 2-D pore structures are not widely used, because the pore structure is less then optimal. Mesopores may be defined, according to the method, in zeolites with 1-D, 2-D, or 3-D pore structures to form a mesostructure having long-range crystallinity. When exposed to the method of making a mesostructure, zeolites with 2-D pore structures result in 3-D mesostructures. Exposing 1-D and 2-D pore structure zeolites to the thick slurry method to form mesostructures can increase the usefulness of these otherwise underused zeolites.

Acid catalysts with well-defined tunable pores are desirable for many applications, including for catalytic cracking of the gas oil fraction of petroleum. In such applications, slight improvements in catalytic activity or selectivity will translate to significant economic benefits. Because the conventional unconverted zeolite crystal having long-range crystallinity has limited diffusion, it is difficult for reaction products, e.g., gasoline from a feed stock, to exit the zeolite. Defining mesopores in the zeolite to form mesostructures improves the limitations of zeolites.

Post-Synthesis Hydrothermal Treatment

The steps for making a long-range crystalline mesostructure may be repeated or cycled to obtain a desired result. One or more of the hydrothermal treatment, surfactant type, surfactant quantity, and the pH may be altered in each successive cycle. A mesostructure still present in the synthesis solution may be hydrothermally treated one or more times. Specifically, after hydrothermal treatment in the pH controlled media in the presence of surfactant and prior to filtration, drying, and calcination, one or more of the hydrothermal treatment, surfactant type, surfactant quantity, and pH may be altered in one or more cycles. Cycles may be employed to further improve the amount, quality, and ordering of the mesoporosity introduced. Synthesis parameters such as, for example, pH, concentration of surfactant, type of surfactant, quantity of solution, and mineralization agents, can be adjusted prior to successive hydrothermal treatment. Various cycles of hydrothermal treatment and parameter synthesis can be used. A mesostructure having long-range crystallinity can be formed in a number of cycle that have a value within the range of from about 1 to about 10 cycles, for example. In each cycle, the hydrothermal temperature can have a value within a range of from about 100 to about 200° C. and a time value within the range of from about 2 hours to about 2 weeks. The method of making the mesostructure can be cycled in the large scale process or from a conventional zeolite having long-range crystallinity.

Other synthesis parameters can also be added to increase the control of the properties of the final material. Such additional synthesis parameters can include adding: mineralizing agents, co-surfactants, swelling agents, metal oxide precursors, adding silica or alumina solubilizing chemicals, adding other mesopore forming agents, for example, polymers, nanoparticles, and/or biomolecules.

Application in Petrochemical Processing

The long-range crystalline mesostructure made by exposing an inorganic material having long-range crystallinity to the method of making a mesostructure has one or more features including controlled pore volume, controlled pore size (e.g., cross sectional area and/or diameter), and/or controlled pore shape. Hydrocarbon, including petrochemical processing, reactions are mass-transfer limited. Accordingly, a mesostructure having long-range crystallinity with controlled pore volume, pore size, and/or pore shape can facilitate transport of the reactants to and within active catalyst sites within the mesostructure catalyst and transport the products of the reaction out of the catalyst. Mesostructures having long-range crystallinity, formed from, for example, zeolites, enable processing of very large or bulky molecules, with critical dimensions having a value of, for example, from about 2 to about 60 nm, from about 5 to about 50 nm, and from about 30 to about 60 nm.

Hydrocarbon and/or petrochemical feed materials that can be processed with the mesostructure materials include, for example, a gas oil (e.g., light, medium, or heavy gas oil) with or without the addition of resids. The feed material can include thermal oils, residual oils, for example, Atmospheric Tower Bottoms (ATB), heavy gas oil (HGO), Vacuum Gas Oil (VGO), and Vacuum Tower Bottoms (VTB), cycle stocks, whole top crudes, tar sand oils, shale oils, synthetic fuels (for example products of Fischer-Tropsch Synthesis), heavy hydrocarbon fractions derived from the destructive hydrogenation of coal, tar, pitches, asphalts, heavy and/or sour and/or metal-laden crude oils, and waxy materials, including, but not limited to, waxes produced by Fischer-Tropsch Synthesis of hydrocarbons from synthesis gas. Hydrotreated feedstocks derived from any of the above described feed materials may also be processed by using the mesostructured zeolitic materials having long-range crystallinity.

Heavy hydrocarbon fractions from crude oil contain most of the sulfur in crude oils, mainly in the form of mercaptans, sulfides, disulfides, thiophenes, benzothiophenes, dibenzothiophenes, and benzonaphthothiophenes, many of which are large, bulky molecules. Similarly, heavy hydrocarbon fractions contain most of the nitrogen in crude oils, principally in the form of neutral N-compounds (indole, carbazole), basic N-compounds (pyridine, quinoline, acridine, phenenthridine), and weakly basic N-compounds (hydroxipyridine and hydroxiquinoline) and their substituted H—, alkyl-, phenyl- and naphthyl-substituted derivatives, many of which are large, bulky materials. Sulfur and nitrogen species are removed for production of clean fuels and resids or deeper cut gas oils with high metals content can also be processed using the fully crystalline mesostructured zeolitic materials and/or the crystalline nanostructure materials of the invention.

The mesostructure having long-range crystallinity can be employed in chemical processing operations including, for example, catalytic cracking, fluidized catalytic cracking, hydrogenation, hydrosulfurization, hydrocracking, hydrosisomerization, oligomerization, or alkylation or any of these in combination. Any of these chemical processing operations may be employed to produce, for example, a petrochemical product by reacting a petrochemical feed material with a mesostructure having long-range crystallinity and a controlled cross sectional area and/or a controlled pore size distribution.

INCORPORATION BY REFERENCE

All of the patents, patent applications and publications cited herein are incorporated by reference.

EQUIVALENTS

Those skilled in the art will recognize, or be able to ascertain using no more than routine experimentation, many equivalents to the specific embodiments of the invention described herein. Such equivalents are intended to be encompassed by the following claims.

What is claimed is:

1. A method of making a mesostructure comprising:
exposing an inorganic material having long-range crystallinity to a solution comprising a pH controlling substance and a surfactant under time and temperature conditions sufficient to define, in said inorganic material, a plurality of mesopores having a controlled cross sectional area forming a mesostructure having long-range crystallinity, wherein the quantity of said solution is in the range of from about 0 volume percent to about 20 volume percent in excess of the amount sufficient to dissolve said pH controlling substance and substantially dissolve said surfactant, wherein said inorganic material is selected from the group consisting of metal oxides, zeolites, zeotypes, aluminophosphates, gallophosphates, zincophosphates, titanophosphates, and mixtures of two or more thereof.

2. The method of claim 1 wherein the ratio of said solution to said inorganic material ranges from about 10 ml/g to about 0.1 ml/g.

3. The method of claim 1 wherein said quantity of said solution produces an autogenous pressure in a closed vessel under said conditions of time and temperature.

4. The method of claim 1 wherein said solution is an aqueous solution.

5. The method of claim 1 wherein said solution and said time and temperature conditions produce a mesostructure having substantially the same hydrothermal stability as said inorganic material.

6. The method of claim 5 wherein the hydrothermal stability of said inorganic material is substantially the same as measured by comparing a property of said inorganic material prior to exposure to steam with said property of said inorganic material after exposure to steam and hydrothermal stability of said mesostructure is measured by comparing said property of said mesostructure prior to exposure to steam with said property of said mesostructure after exposure to steam.

7. The method of claim 1 wherein said pH controlling substance is a base.

8. The method of claim 1 wherein said inorganic material is simultaneously exposed to said pH controlling substance and said surfactant.

9. The method of claim 1 wherein said inorganic material is sequentially exposed to said pH controlling substance and said surfactant resulting in said solution comprising said pH controlling substance and said surfactant.

10. A mesostructure produced by the process of claim 1.

11. The mesostructure of claim 10 wherein said plurality of mesopores have a pore volume and said pore volume is controlled.

12. The mesostructure of claim 11 wherein said pore volume is from about 0.05 cc/g to about 2 cc/g.

13. The mesostructure of claim 12 wherein said controlled cross sectional area has a diameter ranging from about 2 nm to about 60 nm.

14. The mesostructure of claim 10 wherein said controlled cross sectional area has a diameter and said diameter has a controlled distribution range.

15. The mesostructure of claim 10 wherein said plurality of mesopores have a pore arrangement and said pore arrangement is controlled.

16. The mesostructure of claim 10 wherein said plurality of mesopores have a pore arrangement and said pore arrangement is organized.

17. The mesostructure of claim 10 wherein a wall thickness between adjacent mesopores is from about 1 nm to about 50 nm.

18. The mesostructure of claim 10 wherein said mesostructure has a chemical composition framework substantially the same as the chemical composition framework of said inorganic material prior to defining said plurality of mesopores.

19. The mesostructure of claim 10 wherein said mesostructure has a connectivity substantially the same as the connectivity of said inorganic material prior to defining said plurality of mesopores.

20. The mesostructure of claim 10 wherein said inorganic material is a zeolite and said mesostructure has a tetracoordinated aluminum/octacoordinated aluminum ratio substantially the same as the tetracoordinated aluminum/octacoordinated aluminum ratio of said zeolite prior to defining said plurality of mesopores.

21. The mesostructure of claim 10 wherein said mesostructure has a crystal unit cell substantially the same as the crystal unit cell of said inorganic material prior to defining said plurality of mesopores.

* * * * *